United States Patent
Melodia et al.

(10) Patent No.: US 9,924,372 B2
(45) Date of Patent: Mar. 20, 2018

(54) METHOD FOR SHARING OF UNLICENSED RADIO FREQUENCY BANDS BY CELLULAR LTE AND WIFI NETWORKS

(71) Applicant: Northeastern University, Boston, MA (US)

(72) Inventors: Tommaso Melodia, Newton, MA (US); Zhangyu Guan, Chestnut Hill, MA (US)

(73) Assignee: Northeastern University, Boston, MA (US)

(*) Notice: Subject to any disclaimer, the term of this patent is extended or adjusted under 35 U.S.C. 154(b) by 0 days.

(21) Appl. No.: 15/429,377

(22) Filed: Feb. 10, 2017

(65) Prior Publication Data

US 2017/0303135 A1 Oct. 19, 2017

Related U.S. Application Data

(60) Provisional application No. 62/293,392, filed on Feb. 10, 2016.

(51) Int. Cl.
*H04W 16/14* (2009.01)
*H04W 24/02* (2009.01)
*H04W 72/08* (2009.01)

(52) U.S. Cl.
CPC ......... *H04W 16/14* (2013.01); *H04W 24/02* (2013.01); *H04W 72/082* (2013.01)

(58) Field of Classification Search
CPC ... H04W 16/14; H04W 64/00; H04W 72/082; H04W 72/1247; H04B 17/318; H04B 17/345; H04B 1/06; H04L 5/0051

(Continued)

(56) References Cited

U.S. PATENT DOCUMENTS

2010/0040184 A1 2/2010 Haralabidis et al.
2011/0039554 A1 2/2011 Bims et al.
(Continued)

OTHER PUBLICATIONS

A. M. Cavalcante, E. Almeida, R. D. Vieira, F. Chaves, R. C. D. Paiva, F. Abinader, S. Choudhury, E. Tuomaala, and K. Doppler, "Performance Evaluation of LTE and Wi-Fi Coexistence in Unlicensed Bands," in Proc. of IEEE Vehicular Technology Conference (VTC-Spring), Dresden, Germany, Jun. 2013.
(Continued)

*Primary Examiner* — Phuoc H Doan
(74) *Attorney, Agent, or Firm* — Posternak Blankstein & Lund LLP

(57) ABSTRACT

A coexistence scheme enables spectrally-efficient and fair spectrum sharing between a first wireless network and a coexisting wireless network in the same frequency bands. The spectrum sharing problem is modeled as a fairness constrained mixed integer nonlinear optimization problem, by jointly determining dynamic channel selection, carrier aggregation and fractional spectrum access for the first wireless networks, while guaranteeing fair spectrum access for the coexisting wireless network based on a cross-technology fairness criterion. An algorithm based on a combination of branch and bound and successive convex relation techniques is provided to optimally solve the problem, i.e., maximize the utility of the first wireless network with guaranteed optimality precision that can be set arbitrarily at the expense of computational complexity. The coexistence scheme requires no signaling exchange between the first wireless network and the coexisting wireless network, and does not require any changes to the communication protocol stack of the coexisting wireless network.

29 Claims, 10 Drawing Sheets

(58) Field of Classification Search
USPC ........ 455/466, 421, 445, 517; 370/329, 443, 370/252
See application file for complete search history.

(56) References Cited

U.S. PATENT DOCUMENTS

| | | |
|---|---|---|
| 2011/0075586 A1 | 3/2011 | Hu et al. |
| 2012/0195216 A1* | 8/2012 | Wu .................. H04W 72/0486 370/252 |
| 2016/0021679 A1 | 1/2016 | Jose et al. |
| 2016/0183282 A1 | 6/2016 | Balaban et al. |
| 2016/0212625 A1* | 7/2016 | Damnjanovic ... H04W 74/0875 |

OTHER PUBLICATIONS

E. Almeida, A. M. Cavalcante, R. C. D. Paiva, F. S. Chaves, F. M. A. Jr., R. D. V. S. Choudhury, E. Tuomaala, and K. Doppler, "Enabling LTE/WiFi Coexistence by LTE Blank Subframe Allocation," in Proc. of IEEE ICC, Budapest, Hungary, Jun. 2013.

R. Ratasuk, M. A. Uusitalo, N. Mangalvedhe, A. Soni, S. Iraji, C. Wijting, and A. Ghosh, "License-Exempt LTE Deployment in Heterogeneous Network," in Proc. of ISWCS, Paris, France, Aug. 2012, pp. 246-250.

T. Nihtila, V. Tykhomyrov, O. Alanen, M. A. U. A. Sorriy, M. Moisioy, S. Irajix, R. Ratasukz, and N. Mangalvedhez, "System Performance of LTE and IEEE 802.11 Coexisting on a Shared Frequency Band," in Proc. of IEEE WCNC, Shanghai, China, Apr. 2013.

S. S. Sagari, "Coexistence of LTE andWiFi Heterogeneous Networks via Inter Network Coordination," in Proc. of MobiSys PhD Forum, Bretton Woods, NH, Jun. 2014.

S. Yun and L. Qiu, "Supporting WiFi and LTE Co-existence," in Proc. of IEEE INFOCOM, Hong Kong S.A.R., PRC, Apr. 2015.

K. Jain, J. Padhye, V. N. Padmanabhan, and L. Qiu, "Impact of Interference on Multi-hop Wireless Network Performance," in Proc. of ACM MobiCom, San Diego, California, Sep. 2003.

M. Kodialam and T. Nandagopal, "Characterizing the Capacity Region in Multi-Radio Multi-Channel Wireless Mesh Networks," in Proc. ACM MobiCom, Cologne, Germany, Aug. 2005.

S. Sen, J. Yoon, J. Hare, J. Ormont, and S. Banerjee, "Can They Hear Me Now?: A Case for a Client-assisted Approach to Monitoring Widearea Wireless Networks," in Proc. of ACM SIGCOMM Conference on Internet Measurement, Berlin, Germany, Nov. 2011.

I J. Shi, Z. Guan, C. Qiao, T. Melodia, D. Koutsonikolas, and G. Challen, "Crowdsourcing Access Network Spectrum Allocation Using Smartphones," in Proc. ACM HotNets, Los Angeles, California, Oct. 2014.

N Zhang et al. Unlicensed Spectrum Usage Method for Cellular Communication Systems. Networking and Mobile Computing (WiCOM), 2012 8th International Conference on Wireless Communications. Sep. 2012.

S Hajmohammad, H Elbiaze. Unlicensed spectrum splitting between femtocell and WiFi. IEEE International Conference on Communications (ICC), pp. 1883-188, Jun. 2013.

P. Patras, A. Garcia-Saavedra, D. Malone, and D. Leith. Rigorous and Practical Proportional-fair Allocation for Multi-rate Wi-Fi. arXiv:1411.6685v1.

LB LE ; Hossain, E. Resource allocation for spectrum underlay in cognitive radio networks. IEEE Transactions on Wireless Communications, Dec. 2008, vol. 7(12), pp. 5306-5315.

S. S. Sagari et al. Modeling the Coexistence of LTE and WiFi Heterogeneous Networks in Dense Deployment Scenarios. 2015 IEEE International Conference on Communication Workshop (ICCW). Jun. 2015.

C Cano et al. Coexistence of WiFi and LTE in Unlicensed Bands: A Proportional Fair Allocation Scheme. 2015 IEEE International Conference on Communication Workshop (ICCW), Jun. 2015.

Q Chen et al. An opportunistic unlicensed spectrum utilization method for LTE and WiFi coexistence system. 2015 IEEE Global Communications Conference, Dec. 2014. Abstract.

F Chaves et al. LTE UL Power Control for the Improvement of LTE/Wi-Fi Coexistence. 2013 IEEE 78th Vehicular Technology Conference (VTC Fall). Sep. 2013.

N Rupasinghe et al. Reinforcement learning for licensed-assisted access of LTE in the unlicensed spectrum. 2015 IEEE Wireless Communications and Networking Conference (WCNC), Mar. 2015. Abstract.

V. Valls et al. Maximising LTE Capacity in Unlicensed Bands (LTE-U/LAA) while Fairly Coexisting with 802.11 WLANs. IEEE Communications Letters. vol. 20, Issue 6, pp. 1219-1222, Jun. 2016.

* cited by examiner

D: Downlink Subframe
B: Almost-blank Subframe (ABSF)

METHOD FOR SHARING OF UNLICENSED RADIO FREQUENCY BANDS BY CELLULAR LTE AND WIFI NETWORKS

CROSS REFERENCE TO RELATED APPLICATIONS

This application claims priority under 35 § 119(e) of U.S. Provisional Application No. 62/293,392, filed on Feb. 10, 2016, entitled "Method for Sharing of Unlicensed Radio Frequency Bands by Cellular LTE and WiFi Networks," the disclosure of which is hereby incorporated by reference.

STATEMENT REGARDING FEDERALLY SPONSORED RESEARCH OR DEVELOPMENT

The invention was developed with financial support from Contract No. FA8750-14-1-0074 from the Air Force Research Lab. The U.S. Government has certain rights in the invention.

BACKGROUND

With the ongoing deployment of long term evolution (LTE) and LTE-Advanced cellular systems (hereafter LTE for conciseness), an increasing number of smartphones are reaching the market every year. As smartphone penetration has resulted in drastic increase in cellular network traffic loads, service providers (SPs) are facing the challenge of scarce spectrum resources (mainly between 700 MHz and 2.6 GHz). As a possible solution to this problem, some manufacturers and service provider (SPs) have considered extending the new-generation of LTE systems to unlicensed bands (2.4 and 5 GHz) to leverage additional spectrum resources, leading to so-called unlicensed LTE (U-LTE). U-LTE will operate pico/femto cells in unlicensed bands with transmission power levels much lower than typically used in macro cells.

However, extending LTE to unlicensed bands is by no means trivial, primarily because of the lack of compatibility between the radio resource management (RRM) schemes used by LTE and by systems already deployed in unlicensed bands (e.g., Wi-Fi). The underlying RRM policy of LTE systems is in fact based on centralized scheduling on each LTE base station (referred to as eNodeB). This is different from typical systems with distributed control that are already deployed in unlicensed bands, e.g., IEEE 802.11-based (Wi-Fi) systems with RRM based on distributed coordination function (DCF) running in all wireless stations (STAs). It has been observed that the throughput of Wi-Fi systems can be considerably degraded (more than 50% under high traffic loads) in the presence of co-channel interference from LTE systems, which is not desirable especially for SPs who have deployed tens of thousands of Wi-Fi hotspots over the world. To date, there is still no widely accepted coexistence scheme to enable spectrally-efficient and fair spectrum sharing between LTE and Wi-Fi.

SUMMARY OF THE INVENTION

The invention relates to a method and system of sharing a frequency spectrum in a frequency band between a first wireless network and a second coexisting wireless network having overlapping service coverage areas, the first wireless network comprising a plurality of nodes serving user equipment. In some embodiments, the method and system comprise, in a host computer system comprising one or more processors and memory in the first wireless network:

(a) determining a spectrum access time of the first wireless network to be reserved for the coexisting wireless network; and (b) determining a channel assignment and an optimized fractional spectrum access (FSA) profile for each of the nodes in the first wireless network, the FSA profile comprising a percentage of air time during which each node can access one or more assigned channels.

Embodiments of the method and system include the following:

1. A method of sharing a frequency spectrum in a frequency band between a first wireless network and a second coexisting wireless network having overlapping service coverage areas, the first wireless network comprising a plurality of nodes serving user equipment, the method comprising:

in a host computer system comprising one or more processors and memory in the first wireless network:

(a) determining a spectrum access time of the first wireless network to be reserved for the coexisting wireless network; and (b) determining a channel assignment and an optimized fractional spectrum access (FSA) profile for each of the nodes in the first wireless network, the FSA profile comprising a percentage of air time during which each node can access one or more assigned channels.

2. The method of embodiment 1, wherein the channel assignments and FSA profiles are selected to optimize a throughput of the first wireless network, the throughput comprising a data rate of data delivered to the nodes in the first wireless network.

3. The method of any of embodiments 1-2, wherein steps (a) and (b) comprise optimizing a utility function of the first wireless network.

4. The method of embodiment 3, wherein optimizing the utility function comprises maximizing or minimizing the utility function.

5. The method of any of embodiments 3-4, wherein optimizing the utility function comprises searching for a spectrum access profile comprising a channel selection $\alpha$ and FSA profile $\beta$ for the nodes in the first wireless network to satisfy an achieved network utility U equal to or greater than a predefined optimality ratio of an objective function, by iteratively calculating a local upper bound on the objective function through convex relaxation and a local lower bound on the objective function through a local search.

6. The method of embodiment 5, wherein the objective function is an optimization of a utility of the first wireless network subject to a fairness constraint between the first wireless network and the coexisting wireless network.

7. The method of any of embodiments 5-6, wherein the objective function is an optimization of a throughput of the first wireless network subject to a fairness constraint between the first wireless network and the coexisting wireless network.

8. The method of any of embodiments 3-7, wherein optimizing the utility function is based on a fairness criterion for sharing at least a portion of a frequency spectrum between the first wireless network and the coexisting wireless network, wherein the fairness criterion comprises causing no greater performance degradation of the coexisting wireless network than would be caused by another co-located wireless network offering a same level of traffic load.

9. The method of embodiment 8, wherein the fairness criterion comprises a summation of muted air time of the first wireless network and opportunistic transmissions of the coexisting wireless network.

10. The method of any of embodiments 1-9, further comprising determining traffic information of the coexisting wireless network, the traffic information comprising one or more of a rate of data packets, a bit rate, and a volume of data packets transmitted in the coexisting wireless network.

11. The method of embodiment 10, wherein the traffic information is determined by detecting packets transmitted on the coexisting wireless network by packet sniffing.

12. The method of any of embodiments 1-11, further comprising storing a conflict graph of the first wireless network, the conflict graph comprising a set of interference relationships between pairs of nodes in the first wireless network, the interference relationships based on threshold distances between two nodes of each of the pairs of nodes at which the two nodes can transmit on a same channel simultaneously without causing mutual interference.

13. The method of embodiment 12, wherein nodes that conflict according to the conflict graph can share one or more channels based on a time division multiple access technique.

14. The method of any of embodiments 1-13, further comprising determining almost blank subframe (ABSF) patterns based on the reserved spectrum access time, and distributing the ABSF patterns to one or more nodes within the service coverage area of the first wireless network.

15. The method of any of embodiments 1-14, wherein the first wireless network comprises a schedule-based wireless network having a plurality of macro cells, each macro cell in communication within a coverage area of a plurality of micro cells, pico cells, or femto cells, or a combination thereof.

16. The method of any of embodiments 1-15, wherein the first wireless network is a schedule-based channel access network.

17. The method of any of embodiments 1-16, wherein the first wireless network is a cellular network.

18. The method of any of embodiments 1-17, wherein the first wireless network is a long term evolution (LTE) network, an LTE-Advanced network, a 4G network, or a 5G network.

19. The method of any of embodiments 1-18, wherein the host computer system is located at a controlling node of the first wireless network.

20. The method of any of embodiments 1-19, wherein the first wireless network is a long term evolution (LTE) network or an LTE-Advanced network, and the host computer system is located at a macro eNodeB or a mobility management entity/service gateway of the LTE or LTE-Advanced network.

21. The method of any of embodiments 1-20, wherein the coexisting wireless network operates with carrier-sensing-based channel access.

22. The method of any of embodiments 1-21, wherein the coexisting wireless network is a Wi-Fi network, a Bluetooth network, or a Zigbee network.

23. The method of any of embodiments 1-22, wherein the first wireless network and the coexisting wireless network operate in an unlicensed frequency band.

24. The method of any of embodiments 1-23, further comprising transmitting the channel assignments and FSA profiles to one or more of the nodes in the first wireless network.

25. The method of any of embodiments 1-24, further comprising transmitting on the assigned channels using the optimized FSA profile to boost a downlink data rate.

26. A system for sharing a frequency spectrum in a frequency band between a first wireless network and a second coexisting wireless network having overlapping service coverage areas, the first wireless network comprising a plurality of nodes serving user equipment, comprising:
    a host computer system comprising one or more processors and memory, and machine-readable instructions stored in the memory that, upon execution by the one or more processors cause the system to carry out operations comprising:
    (a) determining a spectrum access time of the first wireless network to be reserved for the coexisting wireless network; and
    (b) determining a channel assignment and an optimized fractional spectrum access (FSA) profile for each of the nodes in the first wireless network, the FSA profile comprising a percentage of air time during which each node can access one or more assigned channels.

27. The system of embodiment 26, wherein the channel assignments and FSA profiles are selected to optimize a throughput of the first wireless network, the throughput comprising a data rate of data delivered to the nodes in the first wireless network.

28. The system of any of embodiments 26-27, wherein steps (a) and (b) comprise optimizing a utility function of the first wireless network.

29. The system of embodiment 28, wherein optimizing the utility function comprises maximizing or minimizing the utility function.

30. The system of any of embodiments 28-29, wherein optimizing the utility function comprises searching for a spectrum access profile comprising a channel selection $\alpha$ and FSA profile $\beta$ for the nodes in the first wireless network to satisfy an achieved network utility U equal to or greater than an predefined optimality ratio of an objective function, by iteratively calculating a local upper bound on the objective function through convex relaxation and a local lower bound on the objective function through a local search.

31. The system of embodiment 30, wherein the objective function is an optimization of a utility of the first wireless network subject to a fairness constraint between the first wireless network and the coexisting wireless network.

32. The system of any of embodiments 30-31, wherein the objective function is an optimization of a throughput of the first wireless network subject to a fairness constraint between the first wireless network and the coexisting wireless network.

33. The system of any of embodiments 30-32, wherein optimizing the utility function is based on a fairness criterion for sharing at least a portion of a frequency spectrum between the first wireless network and the coexisting wireless network, wherein the fairness criterion comprises causing no greater performance degradation of the coexisting wireless network than would be caused by another co-located wireless network offering a same level of traffic load.

34. The system of embodiment 33, wherein the fairness criterion comprises a summation of muted air time of the first wireless network and opportunistic transmissions of the coexisting wireless network.

35. The system of any of embodiments 26-34, further comprising determining traffic information of the coexisting wireless network, the traffic information comprising one or more of a rate of data packets, a bit rate, and a volume of data packets transmitted in the coexisting wireless network.

36. The system of embodiment 35, wherein the traffic information is determined by detecting packets transmitted on the coexisting wireless network by packet sniffing.

37. The system of any of embodiments 26-36, further comprising a conflict graph of the first wireless network stored in the memory, the conflict graph comprising a set of interference relationships between pairs of nodes in the first wireless network, the interference relationships based on threshold distances between two nodes of each of the pairs of nodes at which the two nodes can transmit on a same channel simultaneously without causing mutual interference.

38. The system embodiment 37, wherein nodes that conflict according to the conflict graph can share one or more channels based on a time division multiple access technique.

39. The system of any of embodiments 26-38, further comprising determining almost blank subframe (ABSF) patterns based on the reserved spectrum access time, and distributing the ABSF patterns to one or more nodes within the service coverage area of the first wireless network.

40. The system of any of embodiments 26-39, wherein the first wireless network comprises a schedule-based wireless network having a plurality of macro cells, each macro cell in communication within a coverage area of a plurality of micro cells, pico cells, or femto cells, or a combination thereof.

41. The system of any of embodiments 26-40, wherein the first wireless network is a schedule-based channel access network.

42. The system of any of embodiments 26-41, wherein the first wireless network is a cellular network.

43. The system of any of embodiments 26-42, wherein the first wireless network is a long term evolution (LTE) network, an LTE-Advanced network, a 4G network, or a 5G network.

44. The system of any of embodiments 26-43, wherein the host computer system is located at a controlling node of the first wireless network.

45. The system of any of embodiments 26-44, wherein the first wireless network is a long term evolution (LTE) network or an LTE-Advanced network, and the host computer system is located at a macro eNodeB or a mobility management entity/service gateway of the LTE or LTE-Advanced network.

46. The system of any of embodiments 26-45, wherein the coexisting wireless network operates with carrier-based channel access.

47. The system of any of embodiments 26-46, wherein the coexisting wireless network is a Wi-Fi network, a Bluetooth network, or a Zigbee network.

48. The system of any of embodiments 26-47, wherein the first wireless network and the coexisting wireless network operate in an unlicensed frequency band.

49. The system of any of embodiments 26-48, further comprising transmitting the channel assignments and FSA profiles to one or more of the nodes in the first wireless network.

50. The system of any of embodiments 26-49, further comprising transmitting on the assigned channels using the optimized FSA profile to boost a downlink data rate.

51. The system of any of embodiments 50, wherein the first wireless network employs a centralized control of spectrum access and the coexisting wireless network employs a distributed control of spectrum access.

DESCRIPTION OF THE DRAWINGS

The invention will be more fully understood from the following detailed description taken in conjunction with the accompanying drawings in which.

DETAILED DESCRIPTION OF THE INVENTION

Figure 1:
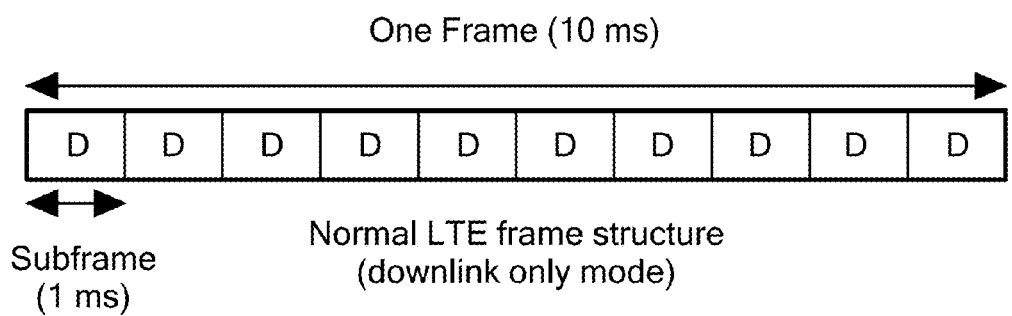
FIG. 1 is a schematic illustration of an LTE frame with Almost-blank Subframes (ABSFs)
Figure 1:
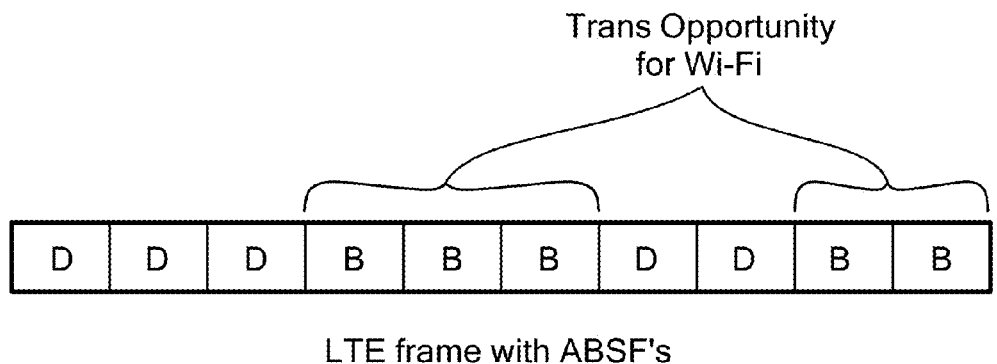

This application incorporates by reference the entire disclosure of U.S. U.S. Provisional Application No. 62/293,392, filed on Feb. 10, 2016, entitled "Method for Sharing of Unlicensed Radio Frequency Bands by Cellular LTE and WiFi Networks."

A method and system for sharing of frequency bands by wireless networks is provided. In particular, a new coexistence scheme is provided to enable spectrally-efficient spectrum sharing between a first wireless network and a second, coexisting wireless network deployed in the same frequency bands in overlapping coverage areas while guaranteeing fairness between them.

In some embodiments, a cognitive coexistence architecture is provided to enable distributed spectrum sharing between the networks on the same unlicensed bands. The architecture is cognitive in that the coexistence does not require a signaling exchange between the networks. The architecture jointly determines dynamic channel selection (which channels to use), carrier aggregation (how many channels to use), and fractional spectrum access (how frequently to access the channel) for the first wireless network, while guaranteeing fair spectrum access for the coexisting wireless network based on cognitively sensing the traffic load level of the coexisting wireless network.

The method employs cross-technology fairness criterion that ensures that the performance degradation caused by, for example, an unlicensed LTE Pico cell to a Wi-Fi network is no more than the performance degradation that would be caused by another co-located Wi-Fi network. The method includes a mathematical model of the spectrum sharing problem for the coexisting networks, and a solution algorithm is provided to solve the resulting fairness-constrained mixed integer nonlinear optimization problem. The algorithm is based on a combination of branch and bound and convex relaxation techniques, with the objective to maximize the aggregate utility of the cellular networks to achieve certain predefined optimality precision while guaranteeing fairness to the wireless networks. The optimality precision can be set as close to 1 as desired, with a resulting tradeoff between utility optimality and computational complexity.

The coexistence scheme can enable spectrally-efficient coexistence between wireless networks without restricting the deployment of the first network to certain unlicensed bands, hence allowing the first network to optimize its spectral efficiency through dynamic spectrum access. The coexistence scheme can also enable fair coexistence between wireless networks based on a new cross-technology fairness criterion. The coexistence scheme can also enable cognitive coexistence so that, for example, the resulting spectrum sharing does not require any changes to the protocol stack of already deployed Wi-Fi networks. The coexistence scheme is backwardly compatible with currently deployed wireless networks.

The method and system can be employed with a variety of wireless networks. In some embodiments, the first wireless network can be a new wireless network deployed in a coverage area that overlaps with an already existing, i.e., coexisting, wireless network. In some embodiments, the first wireless network can be a schedule-based channel access wireless network having a plurality of macro cells, each macro cell in communication within a coverage area of a plurality of micro cells, pico cells, or femto cells, or a combination thereof. In some embodiments, the first wireless network is a cellular network. In some embodiments, the first wireless network is a long term evolution (LTE) network, an LTE-Advanced network, a 4G network, or a 5G network or a future evolution of a wireless network.

In some embodiments, the second, coexisting wireless network operates with carrier-sensing-based channel access. In some embodiments, the coexisting wireless network is a Wi-Fi network, a Bluetooth network, or a Zigbee network.

For purposes of clarity of description, the first wireless network is described below as an LTE cellular network, and the coexisting wireless network is described as a Wi-Fi network. It will be appreciated that the first wireless network and the coexisting wireless network need not be so limited, as indicated above.

I. COEXISTENCE ARCHITECTURE

Consider coexisting LTE and Wi-Fi networks, where there is one LTE Macro cell eNodeB, a set $\mathcal{M}$ of LTE PeNBs, and a set N of Wi-Fi Access Points (APs). Denote the set of LTE User Equipments (UEs) served by each PeNB $m \in \mathcal{M}$ as $\mathcal{L}_m$, and the set of Wi-Fi Stations associated to AP $n \in \mathcal{N}$ as $\mathcal{W}_n$. The coexistence architecture is designed following a Licensed-Assisted Access (LAA) operation mode. That is, the LTE Macro eNodeB operates in a licensed band to transmit critical information (e.g., downlink/uplink control information for authentication, scheduling and handover, among others) and to guarantee Quality of Service (QoS) of UEs. The PeNBs operate in the licensed band for uplink transmissions and in the unlicensed band to boost the downlink data rate based on multi-channel fractional spectrum access (FSA). The communications of Macro eNodeB and PeNBs are coordinated via wideband backbone networks. The objective of the coexistence architecture design is to achieve spectrally-efficient channel access for LTE networks while guaranteeing fairness between LTE and Wi-Fi networks.

A. Multi-Channel Fractional Spectrum Access

The purpose of fractional spectrum access is to mute or limit the transmission (i.e., with zero or reduced transmission power) of LTE networks such that LTE accesses a channel in a fractional portion of air time only. This can be accomplished in each PeNB by transmitting frequently so-called Almost-blank Subframes (ABSFs), which is a feature introduced in 3GPP Rel. 10 for enhanced Inter-Cell Interference Coordination (eICIC). ABSF are special LTE subframes in which a PeNB does not send any data and instead sends only control signals at much lower power and of shorter duration than normal subframes. Consequently, the corresponding channel will be sensed idle and accessed by the coexisting Wi-Fi networks. For example, as shown in FIG. 1, by scheduling five ABSFs during an LTE frame (which includes 10 subframes) the PeNB accesses the channel for approximately 50% of the air time (against 100% in a normal LTE frame) while leaving the other 50% of the time available for Wi-Fi. The more ABSFs are scheduled in a frame by an LTE PeNB, the more transmission opportunities are left for Wi-Fi networks.

Multi-Channel FSA.

Consider unlicensed spectrum bands that are divided into a set $\mathcal{F}$ of non-overlapped channels; for example, channels 1, 6, 11 in the 2:4 GHz band and channels 36, 40, 44, ..., 64 in 5 GHz band. Let $f_n \in \mathcal{F}$ denote the channel selected by Wi-Fi network $n \in \mathcal{N}$. Then, our objective is to assign one or more channels (i.e., with carrier aggregation enabled) to each PeNB $m \in \mathcal{M}$ and decide how frequently PeNB m should access each of the assigned channels.

Let $\alpha \triangleq (\alpha_{mf})_{m \in \mathcal{M}, f \in \mathcal{F}}$ represent the channel assignment profile, with $\alpha_{mf}=1$ if channel f is assigned to PeNB $m \in \mathcal{M}$, and $\alpha_{mf}=0$ otherwise, i.e., $$\alpha_{mf} \in \{0,1\}, \forall m \in \mathcal{M}, f \in \mathcal{F}. \tag{1}$$

Let $F_{max}$ denote the maximum number of channels that each PeNB is allowed to operate on simultaneously. Then, we have $$\sum_{f \in \mathcal{F}} \alpha_{mf} \leq \min(F_{max}, |\mathcal{F}|), \forall m \in \mathcal{M}, \tag{2}$$

where $|\mathcal{F}|$ is the cardinality of channel set $\mathcal{F}$. Here, $F_{max}$ can be determined according to the signal processing capabilities of each PeNB and to achieve a tradeoff between spectrum utilization efficiency and signal processing and signaling overhead.

Further denote $\beta \triangleq (\beta_{mf})_{m \in \mathcal{M}, f \in \mathcal{F}}$ as the FSA profile, where $\beta_{mf} \in [0, 1]$ is the percentage of air time during which PeNB $m \in \mathcal{M}$ accesses channel f. Then, we have $$\beta_{mf} \geq 0, \forall m \in \mathcal{M}, f \in \mathcal{F}, \tag{3}$$

$$\beta_{mf} \leq 1, \forall m \in \mathcal{M}, f \in \mathcal{F}, \tag{4}$$

$$\beta_{mf} \leq \alpha_{mf} \forall m \in \mathcal{M}, f \in \mathcal{F}, \tag{5}$$

where equation (5) implies that PeNB m is not allowed to access channel f if the latter is not assigned to PeNB m.

Let $R_m(\alpha,\beta)$ represent the throughput achievable by PeNB $m \in \mathcal{M}$. Then, the objective of the coexistence architecture is to maximize the utility of LTE networks while guaranteeing certain predefined cross-technology fairness criterion $\Gamma_{l-w}$ between LTE and Wi-Fi networks, i.e., $$\text{Given: } \mathcal{M}, \mathcal{N}, \mathcal{L}_m, \mathcal{W}_n, \Gamma_{l-w}, m \in \mathcal{M}, n \in \mathcal{N} \quad (6)$$

$$\underset{\alpha, \beta}{\text{Maximize}} \ U \triangleq \sum_{m \in \mathcal{M}} U_m(R_m(\alpha, \beta))$$

Subject to: $(1) - (5), \Gamma_{l-w}$ where $U_m(\bullet)$ represents the utility of PeNB m. Note that it is important to guarantee fair spectrum sharing between LTE and Wi-Fi networks, as it has been shown that the throughput of Wi-Fi networks can be considerably degraded with the presence of co-channel interference from LTE networks. Without the fairness constraint, i.e., $\Gamma_{l-w}$ in equation (6), the coexistence architecture will lead to maximizing the aggregate utility of the LTE/Wi-Fi networks as a whole. While this certainly makes sense if LTE and Wi-Fi networks are deployed by the same service provider, the Wi-Fi networks may suffer from low utility otherwise as the optimization gives higher priority in spectrum access to LTE networks that typically has higher spectral efficiency than Wi-Fi.

II. CROSS-TECHNOLOGY FAIRNESS

To define the fairness criterion $\Gamma_{l-w}$ rigorously, the achievable throughput $R_m(\alpha,\beta)$ in equation (6) is derived for U-LTE networks. The derivation is based on the protocol interference model in favor of practical LTE network management, while the fairness definition is based on a combination of protocol and physical interference models to characterize both opportunistic and hidden node transmission behaviors in Wi-Fi networks.

A. U-LTE Throughput

The interference relationship among LTE Pico cells is characterized based on the protocol interference model. Then, the transmission collisions among LTE Pico cells in $\mathcal{M}$ can be represented using a conflict graph $\mathcal{G} \triangleq (\mathcal{M}, \mathcal{I}(\mathcal{M}, \mathcal{M}))$, where the vertices comprise all PeNBs in $\mathcal{M}$ and interference relationship $\mathcal{I}(\mathcal{M}, \mathcal{M})$ is defined as $$\mathcal{I}(\mathcal{M}, \mathcal{M}) \triangleq \{I(m,m') \in \{0,1\} | m, m' \in \mathcal{M}, m \neq m'\}, \quad (7)$$

where two pico cells m and m' are able to transmit on the same channel simultaneously without causing mutual interference if their distance $d_L(m,m')$ is higher than a threshold $d_{th}$, i.e., $I(m,m')=0$ if $d_L(m,m')>d_{th}$, and $I(m,m')=1$ otherwise. The threshold $d_{th}$ can be determined in an online manner for given PeNB transmission power and radio propagation environment, and the conflict graph can be constructed based on the methods as discussed further below.

As described above in Section I, multi-channel FSA allows a channel to be assigned to more than one LTE PeNB. If a channel $f \in \mathcal{F}$ is assigned to PeNBs conflicting with each other according to conflict graph $\mathcal{G}$, the channel will be shared among the PeNBs in a Time Division Multiple Access (TDMA) fashion. Then $$(\beta_{mf} + \beta_{m'f})I(m, m') \leq 1, \ \forall m, m' \in \mathcal{M}, f \in \mathcal{F}, \quad (8)$$

$$(\beta_{mf} + \beta_{m'f} + \beta_{m''f})I(m, m')I(m, m'')I(m', m'') \leq 1, \quad (9)$$
$$\forall m, m', m'' \in \mathcal{M}, f \in \mathcal{F},$$

$$\cdots$$

$$\left(\sum_{m \in \mathcal{M}} \beta_{mf}\right) \prod_{I(m,m') \in \mathcal{I}} I(m, m') \leq 1, \quad (10)$$

where (8) are channel sharing constraints for all two-Pico-cell pairs, and (9) are constraints for all three-pico-cell combinations, and so forth.

Then, the throughput $R_m(\alpha,\beta)$ achievable by LTE Pico cell $m \in \mathcal{M}$ can be expressed as $$R_m(\alpha, \beta) = \left(\sum_{f \in \mathcal{F}} \beta_{mf}\right) R_m^0, \ \forall m \in \mathcal{M}, \quad (11)$$

where parameter $R_m^0$, represents the achievable throughput if pico cell m exclusively occupies channel f. While $R_m^0$ is jointly determined by transmission power of PeNB, the number and locations of UEs served by the PeNB as well as the scheduling policy, it can be measured online by dividing the achieved throughput over the spectrum access time actually available to U-LTE networks.

B. Fairness Criterion

The definition of fairness in the coexistence architecture is simple. That is, the spectrum sharing between U-LTE and Wi-Fi networks is considered to be fair if the performance degradation caused by an LTE Pico cell to the Wi-Fi network is no more than the performance degradation that would be caused by another co-located Wi-Fi network offering the same level of traffic load.

Defining the criterion rigorously is, however, in practice nontrivial primarily because of the lack of compatibility of MAC- and PHY-layer protocols, the uncoordinated LTE and Wi-Fi networks as well as the randomness in Wi-Fi network deployments. To address the challenges, the criterion is defined based on equivalent spectrum access time reservation, and for this purpose the throughput achievable by each Wi-Fi network is first analyzed with co-channel interference from another Wi-Fi network (instead of from a LTE Pico cell).

Wi-Fi Throughput with Interfering Wi-Fi.

Let $R_{w,n}^0$ and $R_{w,n}(n')$ represent the throughput achievable by Wi-Fi network $n \in \mathcal{N}$ without and with interference from another Wi-Fi network n', respectively. Then, $R_{w,n}(n')$ can be expressed as the product of $R_{w,n}^0$ and the percentage of air time available to Wi-Fi n, denoted as $\beta_{w,n}(n') \in [0, 1]$, i.e., $$R_{w,n}(n') = \beta_{w,n}(n') R_{w,n}^0, \quad (12)$$

with $R_{w,n}^0$ corresponding to air time of full spectrum access with $\beta_{w,n}(n')=1$. Hence, to derive $R_{w,n}(n')$ one only needs to derive $\beta_{w,n}(n')$.

A hybrid protocol and physical interference model is adopted to capture the traffic- and propagation-dependent effects of the interfering Wi-Fi network n' on $\beta_{w,n}(n')$, respectively. Based on this model the achievable air time percentage $\beta_{w,n}(n')$ can be expressed as $$\beta_{w,n}(n') = \underbrace{\hat{\beta}_{w,n}(n')}_{\text{Protocol term}} + \underbrace{\tilde{\beta}_{w,n}(n')}_{\text{Opportunistic term}} - \underbrace{\bar{\beta}_{w,n}(n')}_{\text{Hidden node term}}, \quad (13)$$

where $\hat{\beta}_{w,n}(n')$ represents the air time percentage of spectrum access achievable with protocol interference model, and $\tilde{\beta}_{w,n}(n')$ represents the percentage through opportunistic channel access under physical interference model, and $\bar{\beta}_{w,n}(n')$ represents the probability of channel access collisions caused by hidden node transmissions. While $\hat{\beta}_{w,n}(n')$ primarily depends on the traffic load ratio between two Wi-Fi networks, $\tilde{\beta}_{w,n}(n')$ and $\bar{\beta}_{w,n}(n')$ are mainly affected by the signal propagation environment together with network topology.

First, based on protocol interference model and setting infinite interference range, then all transmissions of the interfering Wi-Fi network n' can be perfectly sensed by Wi-Fi n. Further let all Wi-Fi stations have the same opportunity to access the channel, by setting the same contention window size for them in CSMA. Then, the percentage of spectrum access time available to Wi-Fi network n can be expressed as $$\hat{\beta}_{w,n}(n') = \frac{WiFi\ n\ STAs\ \text{plus}\ AP}{\text{All}\ STAs\ \text{plus two}\ APs} = \frac{|W_n|_{up} + 1}{|W_n|_{np} + |W_{n'}|_{up} + 2}, \quad (14)$$

and $1-\hat{\beta}_{w,n}(n')$ for Wi-Fi n'. Here, $|W_n|_{up}$ and $|W_{n'}|_{up}$ count the number of Wi-Fi stations in $W_n$ and $W_{n'}$ that have data to transmit in uplinks (i.e., to AP), respectively.

The resulting $\hat{\beta}_{w,n}(n')$ needs to be calibrated (as discussed below) to account for the effects of radio signal propagation, since in real networks the interference range causing harmful effects is finite only.

Then, based on physical interference model, the opportunistic term $\tilde{\beta}_{w,n}(n')$ in equation (13) can be written as $$\tilde{\beta}_{w,n}(n') = \underbrace{(1 - \hat{\beta}_{w,n}(n'))}_{\substack{\text{Interfering}\\ \text{Wi-Fi}\ n'\ \text{transmits}\\ \text{opportunistic}}} \cdot \underbrace{\eta_{w,n}(n')}_{\text{Wi-Fi}\ n\ \text{transmits}} \quad (15)$$

where $\eta_{w,n}(n')$ represents the channel access probability of Wi-Fi n with an ongoing interfering transmission in Wi-Fi n'. Let $P_w$ represent the transmission power of each Wi-Fi AP, $H_{w,n}(n')$ and $h_{w,n}(n')$ represent the experienced path loss and channel fading coefficient from AP n' to n, and $P_{th}$ the channel detection threshold above which a channel is sensed to be busy and sensed to be idle otherwise. Then $\eta_{w,n}(n')$ can be expressed as $$\eta_{w,n}(n') = prob[P_w H_{w,n}(n')h_{w,n}(n') \leq P_{th}] \quad (16)$$

$$= prob\left[h_{w,n}(n') \leq \frac{P_{th}}{P_w H(d_w(n,n'))}\right],$$

where $H_{w,n}(n')=H(d_w(n,n'))$ with $d_w(n,n')$ being the distance between Wi-Fi APs n and n'.

Finally, when Wi-Fi network n is transmitting (with probability $\hat{\beta}_{w,n}(n')$ in (14)), the interfering Wi-Fi network n' may also access the channel opportunistically. The corresponding probability, denoted as $\tilde{\beta}_{w,n}(n)$, can be calculated similarly as $\tilde{\beta}_{w,n}(n')$ in (15). If the opportunistic access causes sufficiently high interference at Wi-Fi n, transmission collision occurs (i.e., hidden node collision). Again, if we use detection threshold $P_{th}$ as an indication of high and low interference, the collision probability denoted as $\bar{\eta}_{w,n}(n')$ is then $$\bar{\eta}_{w,n}(n') = prob[P_w H_{w,n}(n')h_{w,n}(n') > P_{th}] = 1 - \eta_{w,n}(n'), \quad (17)$$

and the hidden-node term $\bar{\beta}_{w,n}(n')$ in (13) can be given as $$\bar{\beta}_{w,n}(n') = \underbrace{\hat{\beta}_{w,n}(n')}_{\substack{\text{Wi-Fi}\ n\\ \text{transmits}}} \cdot \underbrace{\tilde{\beta}_{w,n}(n')}_{\substack{\text{Wi-Fi}\ n'\\ \text{opportunistic}\\ \text{access}}} \cdot \underbrace{\bar{\eta}_{w,n}(n')}_{\substack{\text{High}\\ \text{interference}}}, \quad (18)$$

where the three items at the right-hand side represent the probability that Wi-Fi n transmits (given in (14)), the interfering Wi-Fi n' opportunistically access the channel, and their transmissions collide at Wi-Fi n, respectively.

Spectrum Access Time Reservation with Interfering LTE.

So far the percentage of spectrum access time available to Wi-Fi n, i.e., $\beta_{w,n}(n')$ in equation (13), has been obtained by considering that the interferer is another Wi-Fi network n'. Now Wi-Fi n' is replaced with an LTE Pico cell m which accesses channel $f_n$ (i.e., the channel used by Wi-Fi network n) in $\beta_{m,f_n}$ portion of air time as defined in (3)-(5). Then, the percentage of spectrum access time available to Wi-Fi n, denoted as $\beta_{w,n}(m)$, can be calculated as $$\beta_{w,n}(m) = \underbrace{1 - \beta_{m,f_n}}_{\text{LTE muted}} + \underbrace{\beta_{m,f_n}\tilde{\beta}_{w,n}(m)}_{\substack{\text{Wi-Fi}\\ \text{opportunistic}\\ \text{transmission}}}, \quad (19)$$

where $1-\beta_{m,f_n}$ is the percentage of air time in which LTE is muted, and $\beta_{m,f_n}\tilde{\beta}_{w,n}(m)$ is the probability that Wi-Fi n is able to access the channel opportunistically with $\tilde{\beta}_{w,n}(m)$ being calculated similarly as in (15).

As noted above in Section II-B, the rationale of cross-technology fairness $\Gamma_{1-w}$ is to ensure that an LTE Pico cell does not degrade Wi-Fi network n more than the interfering Wi-Fi n'. Therefore $$\beta_{w,n}(m) \geq \beta_{w,n}(n') \Rightarrow \beta_{m,f_n} \leq \frac{1 - \beta_{w,n}(n')}{1 - \tilde{\beta}_{w,n}(m)}, \quad (20)$$

with $\beta_{w,n}(m)$ and $\beta_{w,n}(n')$ given in (19) and (13), respectively. Moreover, based on multi-channel FSA in Section I, channel $f_n$ can be assigned to multiple LTE Pico cells and shared among them in a TDMA manner. Intuitively, a Pico cell located far from Wi-Fi n should be allocated more air time on channel $f_n$ since it causes lower-level interference, and less and even zero air time of spectrum access for nearby Pico cells. To account for this intuition, $\beta_{w,n}(n' \triangleq m)$ is first obtained for all Pico cells $m \in \mathcal{M}$ according to (13), and then the percentage of air time that should be reserved for Wi-Fi network n is obtained again by calculating a weighted summation of $\beta_{w,n}(n' \triangleq m)$, denoted by $\beta_{w,n}$ as $$\beta_{w,n} = \sum_{m \in \mathcal{M}} \beta_{w,n}^2 (n' \triangleq m) / \sum_{m \in \mathcal{M}} \beta_{w,n}(n' \triangleq m), \quad (21)$$

where $\beta_{w,n}(n' \triangleq m)$ means calculating $\beta_{w,n}(n')$ according to (13) by deploying the interfering Wi-Fi n' at LTE Pico cell $m \in \mathcal{M}$. Then, the constraints in (19) and (20) can be rewritten as $$\underbrace{1 - \sum_{m \in \mathcal{M}} \beta_{mf_n}}_{\text{LTE muted}} + \underbrace{\sum_{m \in \mathcal{M}} \beta_{mf_m} \tilde{\beta}_{w,n}(m)}_{\substack{\text{Wi-Fi} \\ \text{opportunistic} \\ \text{transmission}}} \geq \beta_{w,n}. \quad (22)$$

In (21) if Pico cell m is located closer to Wi-Fi n it results in a smaller $\beta_{w,n}(n' \triangleq m) \in [0, 1]$ and hence is less weighted; $\beta_{w,n}$ reduces to $\beta_{w,n}(n' \triangleq m)$ if Pico cell m is the only interferer.

Summary:

So far, a coexistence architecture and associated cross-technology fairness criterion have been presented. To study how coexisting LTE and Wi-Fi networks interact with each other in spectrum sharing based on the coexistence architecture, next the resulting fairness constrained network utility maximization problem is solved and their spectrum access behaviors analyzed based on the optimization results.

V. UTILITY MAXIMIZATION

To be concrete, consider individual utility function $U_m \triangleq \log(\cdot)$ in (6), which introduces proportional fairness among LTE Pico cells. The utility maximization problem (6) can then be rewritten as Given: $\mathcal{M}, \mathcal{N}, \mathcal{L}_m, \mathcal{W}_n, \mathcal{G}, \beta_{w,n}, \forall m \in \mathcal{M}, n \in \mathcal{N}$ (23)

$$\underset{\alpha,\beta}{\text{Maximize}} \; U \triangleq \sum_{m \in \mathcal{M}} \log\left(R_m^0 \sum_{f \in \mathcal{F}} \beta_{mf}\right)$$

Subject to: 1) – (5), (7) – (22).

The resulting problem is a mixed integer nonlinear optimization problem (MINLP), because channel assignment variables $\alpha_{mf}, m \in \mathcal{M}, f \in \mathcal{F}$, take only binary values in constraints (1), (2) and (5). Given an arbitrary such problem, there are no existing algorithms to obtain the global optimum with polynomial computational complexity with respect to the number of integer variables. Accordingly, a solution algorithm is designed based on a combination of branch and bound and successive convex relaxation techniques to decide the optimal channel access profile (in the sense satisfying certain predefined optimality precision) for the coexisting LTE/Wi-Fi networks.

Overall Algorithm.

Denote the globally optimal objective function of problem (23) as $U^*$. Then the algorithm is designed to search for spectrum access profiles $\alpha$ and $\beta$ so that the achieved network utility U satisfies $U \geq \epsilon U^*$, with $\epsilon \in (0, 1]$ being certain predefined optimality ratio. To this end, the algorithm iteratively maintains a global upper bound $\overline{U}_{glb}$ and a global lower bound $\underline{U}_{glb}$ on U, with $\underline{U}_{glb} \leq U^* \leq \overline{U}_{glb}$. The algorithm also maintains a set of sub-problems of the original optimization problem (23). Denote the set of feasible sets of the resulting subproblems as $\tilde{\Upsilon} = \{\Upsilon_i | i = 1, 2, \ldots\}$, with $\Upsilon_i$ representing the feasible set of sub-problem i.

The algorithm is initialized by setting $\underline{U}_{glb} = -\infty$, $\overline{U}_{glb} = +\infty$ and $\tilde{\Upsilon} = \{\Upsilon_0\}$, where $\Upsilon_0$ represents the feasible set of the original optimization problem (23). Then, $\Upsilon_0$ is partitioned into two subsets $\Upsilon_1$ and $\Upsilon_2$, with $\Upsilon_1, \Upsilon_2 \subset \Upsilon_0$ and $\Upsilon_1 \cup \Upsilon_2 = \Upsilon_0$. For each new subset $\Upsilon_i$, i=1, 2 the algorithm calculates a local upper bound $\overline{U}_{lcl}(\Upsilon_i)$ through convex relaxation and a local lower bound $\underline{U}_{lcl}(\Upsilon_i)$ through local search. After the first iteration, $\tilde{\Upsilon}$ is updated as $\tilde{\Upsilon} = \{\Upsilon_1, \Upsilon_2\}$. The subset partition procedures proceed iteratively, and in each iteration the algorithm selects a subset from $\tilde{\Upsilon}$, partitions the selected subset into two new smaller subsets, and then calculates the local and upper bounds over each of them. After each iteration, the algorithm updates the global upper and lower bounds as $$\overline{U}_{glb} = \max_{\Upsilon_i \in \tilde{\Upsilon}} \{\overline{U}_{lcl}(\Upsilon_i)\}, \quad (24)$$

$$\underline{U}_{glb} = \max_{\Upsilon_i \in \tilde{\Upsilon}} \{\underline{U}_{lcl}(\Upsilon_i)\}, \quad (25)$$

and the algorithm terminates if $\underline{U}_{glb} \geq \epsilon \overline{U}_{glb}$ is satisfied.

In each iteration, subset $\Upsilon_i \in \tilde{\Upsilon}$ is selected for further partition such that the local upper bound $\overline{U}_{lcl}(\Upsilon_i)$ of the corresponding subproblem is the highest among all the subsets in $$\tilde{\Upsilon}, \text{ i.e., } i = \arg\max_i \overline{U}_{lcl}(\Upsilon_i),$$

and partition $\Upsilon_i$ by fixing a channel assignment variable $\alpha_{mf}$ to $\alpha_{mf} = 0$ and $\alpha_{mf} = 1$. The convex relaxation and the local search methods are next described as follows.

Convex Relaxation.

The objective of convex relaxation is to obtain a local upper bound for each selected subproblem. To this end, a fractional spectrum access (FSA) profile β is obtained by solving (23) without considering constraints (1) and (2) and with $\alpha_{mf}$ set to 1 in (5), i.e., by allowing each LTE PeNB to operate on up to $F_{max} = |\mathcal{F}|$ channels simultaneously. The resulting optimization problem is convex, since the utility function U in (23) is concave with respect to $\beta_{mf}$ and the feasible set defined through (3)-(5), (8)-(10), (20) and (22) is convex. Consequently, the global optimum of the convexified MINLP can be obtained efficiently using standard convex optimization techniques, e.g., interior point methods. Denote the resulting optimal FSA profile β as $\beta^* \triangleq (\beta_{mf}^*)_{m \in \mathcal{M}, f \in \mathcal{F}}$, based on which one can obtain a channel selection profile $\alpha^* = (\alpha_{mf}^*)_{m \in \mathcal{M}, f \in \mathcal{F}}$ with $\alpha_{mf}^* = 1$ if $\beta_{mf}^* > 0$, and $\alpha_{mf}^* = 0$ otherwise. The corresponding aggregate utility provides an upper bound on the objective function U of the current subproblem.

Local Search.

Based on the obtained optimal solution of the relaxed convex optimization problem, the number of channels assigned to Pico cell $m \in \mathcal{M}$, denoted as $F_m^*$, can be represented as $$F_m^* = \sum_{j \in \mathcal{F}} \alpha_{mf}, \forall m \in \mathcal{M}. \quad (26)$$

If $F_m^* \leq F_{max}$ for all Pico cells $m \in \mathcal{M}$, $\alpha^*$ and $\beta^*$ are the optimal solutions to the original MINLP (23); otherwise, the channel assignment for Pico cells that have been assigned more than $F_{max}$ channels is adjusted. Denote the corresponding set of Pico cells as $\mathcal{M}' = \{m | m \in \mathcal{M}, F_m^* > F_{max}\}$, and let $\mathcal{F}_m \triangleq \{f | f \in \mathcal{F}, \beta_{mf}^* > 0\}$ represent the set of channels assigned to each PeNB $m \in \mathcal{M}'$. Without loss of generality, further let $$\beta_{mf_1}^* \geq \beta_{mf_2}^* \geq \cdots \geq \beta_{mf_{p_{max}}}^* \geq \cdots \geq \beta_{mf_{p'_m}}^*, \quad (27)$$

with $f_k \in \mathcal{F}_m$, $\forall k=1, \ldots, F_m^*$. Then, let PeNB $m^* \in \mathcal{M}'$ operate on channels $f_k \in \mathcal{F}_{m^*}$ with $k \leq F_{max}$, with PeNB $m^*$ determined according to $$m^* = \underset{m \in \mathcal{M}'}{\operatorname{argmax}} \sum_{k=1}^{F_{max}} \beta_{m,f_k}^*, \quad (28)$$

The rationale behind (27) and (28) is to fix the channel selection profile for the PeNB corresponding to the most deterministic FSA profile. This results in two additional constraints on the channel selection profile $\alpha$ and FSA profile $\beta$, $$\alpha_{m^*f_{k'}} = 0, \forall f_{k'} \in \mathcal{F}_{m^*}, k' > F_{max}, \quad (29)$$

$$\beta_{m^*f_{k'}} \geq \beta_{m^*f_{k'}}^*, \forall f_{k'} \in \mathcal{F}_{m^*}, k' \leq F_{max}, \quad (30)$$

which means that PeNB $m^*$ should not be assigned channel $f_{k'}$ anymore and should be assigned at least $\beta_{m^*f_{k'}}$ spectrum access time on channel $f_{k'}$ in the following channel assignment adjustment. Constraints (29) and (30) are then incorporated into (23), and the procedure of convex relaxation and local search is repeated until the carrier aggregation constraint (2) is satisfied by all LTE Pico cells $m \in \mathcal{M}$. The resulting aggregate utility is used to serve as a local lower bound on the objective function U of the current subproblem.

Theorem 1:

Given a spectrum sharing problem (23) with global optimum U* and any predefined optimality precision $\epsilon \in (0, 1]$, the algorithm always achieves aggregate network utility U that satisfies $U \geq \epsilon U^*$.

Proof:

The proof follows the fact that, in the designed solution algorithm only binary channel assignment variables $\alpha_{mf}$ are partitioned while the operation is not needed for fractional spectrum variables $\beta_{mf}$. This implies that, in the worst case, the algorithm ends up with a maximum number $\mathcal{F}^{|\mathcal{M}|}$ of subproblems. In each subproblem i the channel assignment variables are all fixed to either $\alpha_{mf} = 0$ or $\alpha_{mf} = 1$, and the resulting subproblem is convex with respect to fractional spectrum access variables $\beta_{mf}$ and hence there is no gap between the calculated local upper bound $\overline{U}_{lcl}(\Upsilon_i)$ and the lower bound $\underline{U}_{lcl}(\Upsilon_i)$. According to the update criterion in (24) and (25), the global upper bound $\overline{U}_{glb}$ and the global lower bound $\underline{U}_{glb}$ can be guaranteed to converge to each other, and hence the predefined optimality condition $U \geq \epsilon U^*$ can be satisfied. The tradeoff between utility optimality and computational complexity can be achieved by terminating the algorithm once the optimality condition is satisfied. Further, to speed up convergence of the algorithm, a subset $\Upsilon_i$ will be removed from $\tilde{\Upsilon}$ if the resulting local upper bound satisfies $\overline{U}_{lcl}(\Upsilon_i) < \underline{U}_{glb}$, which implies that it is impossible to attain the global optimum of the original problem (23) by further partitioning subset $\Upsilon_i$. Further details of the proof are omitted.

IV. IMPLEMENTATIONS

The coexistence method and system described herein are amenable to implementation in a cognitive manner that requires no signaling exchange between the coexisting LTE and Wi-Fi networks. In some embodiments, the spectrum access optimization can be conducted in a host server equipped with sufficiently powerful computing and storage capability. In some embodiments, the host server may be located at an LTE Macro eNodeB or a Mobility Management Entity/Service Gateway (MME/S-GW) to oversee tens and up to hundreds U-LTE Pico cells. Functionalities that run in the host server include calculating the spectrum access time that should be reserved for the coexisting Wi-Fi networks according to the approach discussed in Section II, and running the optimization solution algorithm in Section III to maximize the utility of the U-LTE networks.

The spectrum access optimization requires the host server to know the traffic information of the coexisting Wi-Fi networks. In some embodiment, this can be accomplished through packet sniffing based on smartphone-based crowd-sourcing. A set of smartphones equipped with LTE/Wi-Fi dual radio interfaces can be used to overhear the packets sent by the Wi-Fi networks without actually connecting to the networks. The overheard Wi-Fi information is sent to the host server and then used there to calculate the optimal FSA profile $\beta^*$. The optimization results are then fed to the Macro eNodeB, which then generates ABSF patterns by configuring each subframe to be blank subframe following probability profile $\beta^*$. The distribution of the ABSF configuration results from the Macro eNodeB to the PeNBs within its service coverage can be conducted via the X2 interface provided in 3GPP Rel. 10.

The host server can also construct the conflict-graph of the LTE networks. This can be accomplished with different methods known in the art, for example, distance-based criteria, methods based on the received signal strength (RSS), measurement-based RF propagation model methods, and online calibration methods. Particularly, in an online calibration method, the RSS measurement can be conducted through a set of pre-deployed static sensors, which requires extra hardware deployment, and this restriction can be relaxed by taking the advantages of the sensing capability of smartphones to measure the RSS map.

The coexistence scheme can allow a cellular network to access any portion of a spectrum, including for example, an entire unlicensed spectrum band, and hence can utilize the spectrum more efficiently. In some embodiments, the method can allow operation of a cellular network in a 2.4 to 2.5 GHz (termed 2.4 GHz) radio band or a 5.725 to 5.875 GHz (termed 5 GHz) radio band.

The method and system can enable the cellular network to send Almost Blank Subframes (ABSFs) in a dynamic and optimal manner. The method and system can use centralized scheduling for the cellular network, which is more spectrally efficient than, for example, a listen-before-talk technique.

The method and system can enable harmonious coexistence between cellular and wireless networks in diverse network settings, with nearly optimal spectrum assignments for the cellular networks and guaranteed spectrum access for the wireless networks.

The method and system define mathematically a cross-system fairness criterion by which any performance degradation caused by one wireless network is no more than degradation caused by another wireless network.

The method and system enable the extension of wireless networks to unlicensed spectrum bands. The method and system can be implemented in, for example, next-generation 4G and 5G cellular networks and future evolutions of wireless networks, and can increase the spectral efficiency of such networks. With the method, service providers can serve more mobile users with higher quality-of-service (QoS) without extra monetary investment to obtain new spectrum resources. The method can be used to design software-defined Wi-Fi networks with improved spectral efficiency compared to present Wi-Fi networks.

In some embodiments, the method can be implemented in a LTE or LTE-A cellular network having a plurality of nodes at which transceiver equipment is located. In some embodiments, a host computer can be located at a controlling node, for example, a macro eNodeB or a mobility management entity/service gateway of an LTE or LTE-A network. A determined channel assignment and FSA profile can be communicated to nodes or cells, such as micro cells, pico cells, or femto cells, or a combination thereof, or to nodes that can operate at a lower transmission power level than the macro node within the service coverage area of the macro node. The nodes can serve a variety of types of User Equipment (UE), such as mobile phones, cell phones, smart phones, computers with wireless Internet connectivity, and the like.

The host computer or computing system can include one or more processors and memory that executes programming for the coexistence method as described herein. The computing system can be implemented as or can include a computing device that includes a combination of hardware, software, and firmware that allows the computing device to run an applications layer or otherwise perform various processing tasks. Computing devices can include without limitation personal computers, work stations, servers, laptop computers, tablet computers, mobile devices, hand-held devices, wireless devices, smartphones, wearable devices, embedded devices, microprocessor-based devices, microcontroller-based devices, programmable consumer electronics, mini-computers, main frame computers, and the like.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used, including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic device, masked-programmed gate arrays, field programmable gate arrays (FPGAs), and application specific integrated circuits (ASICs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the method and system described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in these embodiments.

The computing device can include one or more input/output interfaces for connecting input and output devices to various other components of the computing device. Input and output devices can include, without limitation, keyboards, mice, joysticks, microphones, displays, touch-screens, monitors, scanners, speakers, and printers. Interfaces can include universal serial bus (USB) ports, serial ports, parallel ports, game ports, and the like.

V. EXAMPLES

Consider a coexisting wireless networks with a communication area 300×300 m², 10 randomly located (with uniform distribution) Wi-Fi networks, and 1~11 uniformly deployed LTE Pico cells, and up to ten channels (3 in 2.4 GHz band and 7 in 5 GHz band). The maximum number of channels each LTE PeNB is able to operate on simultaneously is set to $F_{max}$=1, 3, 5, 10. Uplink/downlink traffic ratio is set to 0.25 for each Wi-Fi network, and U-LTE/Wi-Fi traffic ratio is set to 0.15~1.6 with step 0.3. The transmission power of all nodes, channel detection threshold, and the power density of additive Gaussian white noise (AGWN) are set to typical values 17 dBm, −82 dBm, and −92 dBm/Hz, respectively. Path loss model is L=37+30 log 10(d) with d being distance in meter, multipath fading is set as in 4 to be Rayleigh.

Example 1—Case Study

Figure 2A:
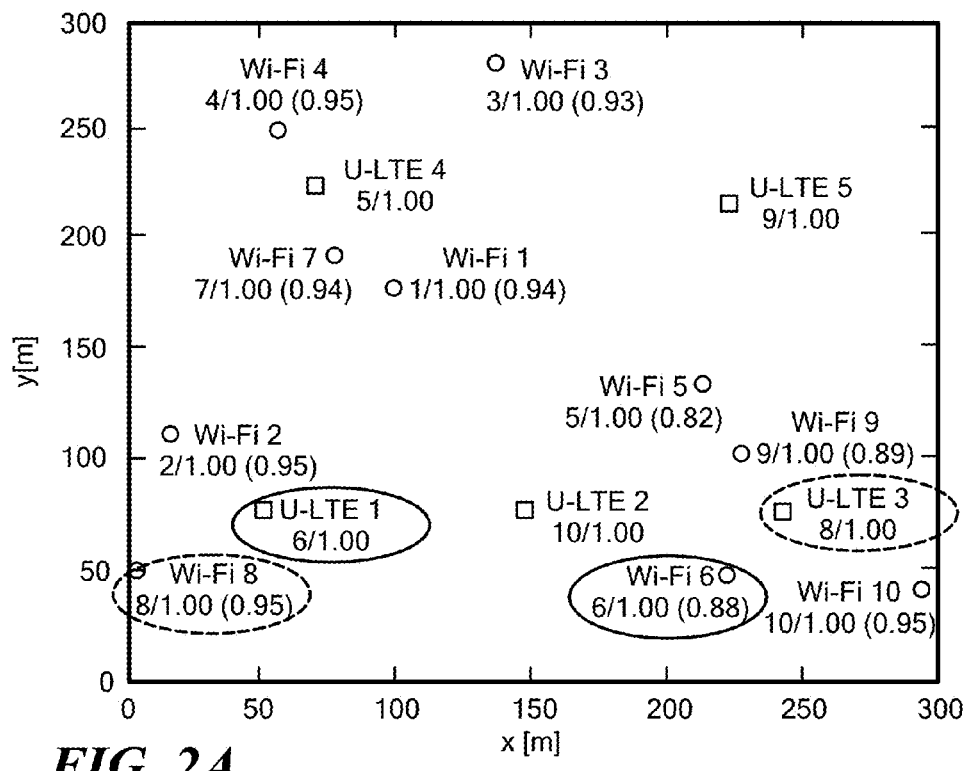
FIG. 2A is a plot of channel assignment without carrier aggregation for a U-LTE network and a Wi-Fi network, in which each U-LTE node indicates the channel assigned and fractional spectrum access (FSA) and each Wi-Fi access point indicates the channel assigned and achievable FSA (and expected FSA)
Figure 2B:
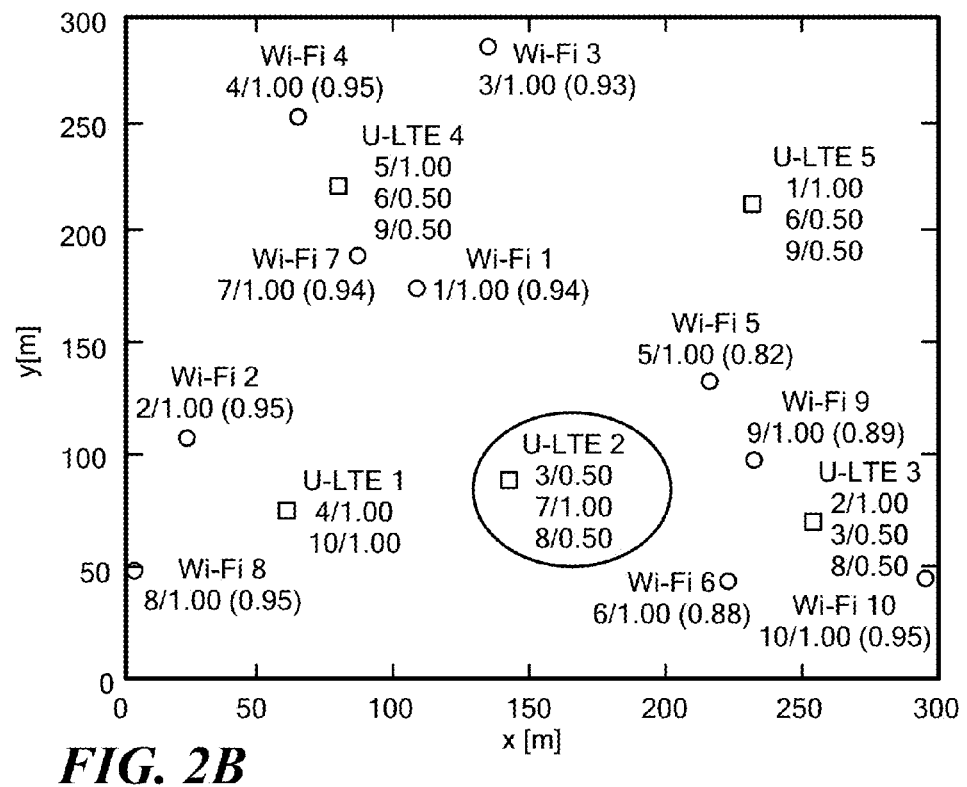
FIG. 2B is a plot of channel assignment with carrier aggregation for a U-LTE network and a Wi-Fi network, in which each U-LTE node indicates the channel assigned and fractional spectrum access (FSA) and each Wi-Fi access point indicates the channel assigned and achievable FSA (and expected FSA)

Two examples of spectrum access are examined in FIGS. 2A and 2B, where there are five LTE Pico cells and 10 Wi-Fi networks, and U-LTE/Wi-Fi traffic ratio is set to 1. In FIG. 2A each LTE PeNB is configured to operate on only one channel (i.e., no carrier aggregation), and the channel assignment results for each LTE Pico cell and each Wi-Fi, and the corresponding fractional spectrum access (FSA) coefficient as well as the expected FSA coefficient are plotted. One can see that, based on the proposed coexistence scheme all LTE Pico cells are able to operate on a channel with full spectrum access (i.e., $\beta_{mf}=1$), e.g., LTE 1 on channel 6 coexisting with Wi-Fi 6, while LTE 3 on channel 8 coexisting with Wi-Fi 8. Through dynamic channel selection, each resulting coexisting LTE/Wi-Fi pair is located sufficiently far from each other, and consequently all Wi-Fi networks also achieve full spectrum access.

In FIG. 2B, carrier aggregation is enabled by allowing each LTE PeNB to operate on up to three channels simultaneously (i.e., $F_{max}=3$). It can be seen that all LTE Pico cells achieve air time of spectrum access twice of that without carrier aggregation (i.e., in total 2.00 against 1.00), while not degrading the performance of Wi-Fi networks. For example, LTE 2 operates on channel 3 with FSA coefficient 0.5, and 1.0 and 0.5 on channels 7 and 8, respectively. More examples are given in Table 1, where the spectrum access results are reported for LTE networks 1, 2 and 3 (out of 5 networks) and for Wi-Fi networks 3, 4 and 5 (out of 10 in total). Similarly, compared to the case without carrier aggregation (row 1 of each example), with carrier aggregation the spectrum access time is considerably increased for all LTE networks without any noticeable degradation to Wi-Fi performance. Particularly, in example #4, without carrier aggregation LTE 1 and Wi-Fi 7 achieve spectrum access time 0.57 and 0.87, respectively, where 0.87 is the minimum air time guaranteed by the cross-technology fairness criterion; with carrier aggregation enabled, both the two networks harvest more spectrum access time, which are increased by 2.34 (0.67+1.0+0.67) and 1.0, respectively. In all the tested instances, it is found that fair spectrum access between LTE and Wi-Fi networks can be always guaranteed based on the proposed coexistence architecture.

TABLE I

Spectrum assignment without (top row) and with (bottom row) carrier aggregation.

| # | LTE 1 | LTE 2 | LTE 3 | Wi-Fi 3 | Wi-Fi 4 | Wi-Fi 5 |
|---|---|---|---|---|---|---|
| 1 | 3/1.00 | 1/1.00 | 8/1.00 | 1.00(0.89) | 1.00 (0.94) | 1.00 (0.94) |
|   | 2/0.46 | 2/0.54 | 1/1.00 | 0.92 (0.89) | 1.00 (0.94) | 1.00 (0.94) |
|   | 3/0.57 | 3/0.43 | 8/0.33 |  |  |  |
|   | 7/0.46 | 7/0.54 | 10/1.00 |  |  |  |
| 2 | 8/1.00 | 6/1.00 | 7/1.00 | 1.00 (0.94) | 1.00 (0.89)) | 1.00 (0.95) |
|   | 1/0.50 | 3/0.33 | 1/0.50 | 1.00 (0.94) | 0.94 (0.89)) | 1.00 (0.95) |
|   | 9/0.50 | 5/1.00 | 9/0.50 |  |  |  |
|   | 10/0.50 | 8/1.00 | 10/0.50 |  |  |  |
| 3 | 6/1.00 | 10/1.00 | 9/1.00 | 1.00 (0.95) | 1.00 (0.94)) | 1.00 (0.88) |
|   | 3/0.50 | 6/0.67 | 1/1.00 | 1.00 (0.95) | 1.00 (0.94)) | 1.00 (0.88) |
|   | 4/0.50 | 7/0.67 | 6/0.33 |  |  |  |
|   | 5/0.50 | 10/1.00 | 8/1.00 |  |  |  |
| 4 | 7/0.57 | 10/1.00 | 5/1.00 | 1.00 (0.95) | 1.00 (0.94)) | 0.87 (0.87) Wi-Fi 7 |
|   | 2/0.67 | 3/0.50 | 3/0.50 | 1.00 (0.95) | 1.00 (0.94)) | 1.00 (0.87) |
|   | 8/1.00 | 4/0.50 | 4/0.50 |  |  | Wi-Fi 7 |
|   | 9/0.67 | 10/0.50 | 10/0.50 |  |  |  |
| 5 | 2/1.00 | 10/1.00 | 8/1.00 | 1.00 (0.86) | 1.00 (0.88)) | 1.00 (0.95) |
|   | 2/1.00 | 1/0.47 | 6/0.67 | 1.00 (0.95) | 1.00 (0.94)) | 0.99 (0.88) |
|   | 4/1.00 | 5/0.47 | 8/0.67 |  |  |  |
|   | 6/0.33 | 10/0.56 | 9/1.00 |  |  |  |

Example 2—Optimality and Fairness

Figure 3A:
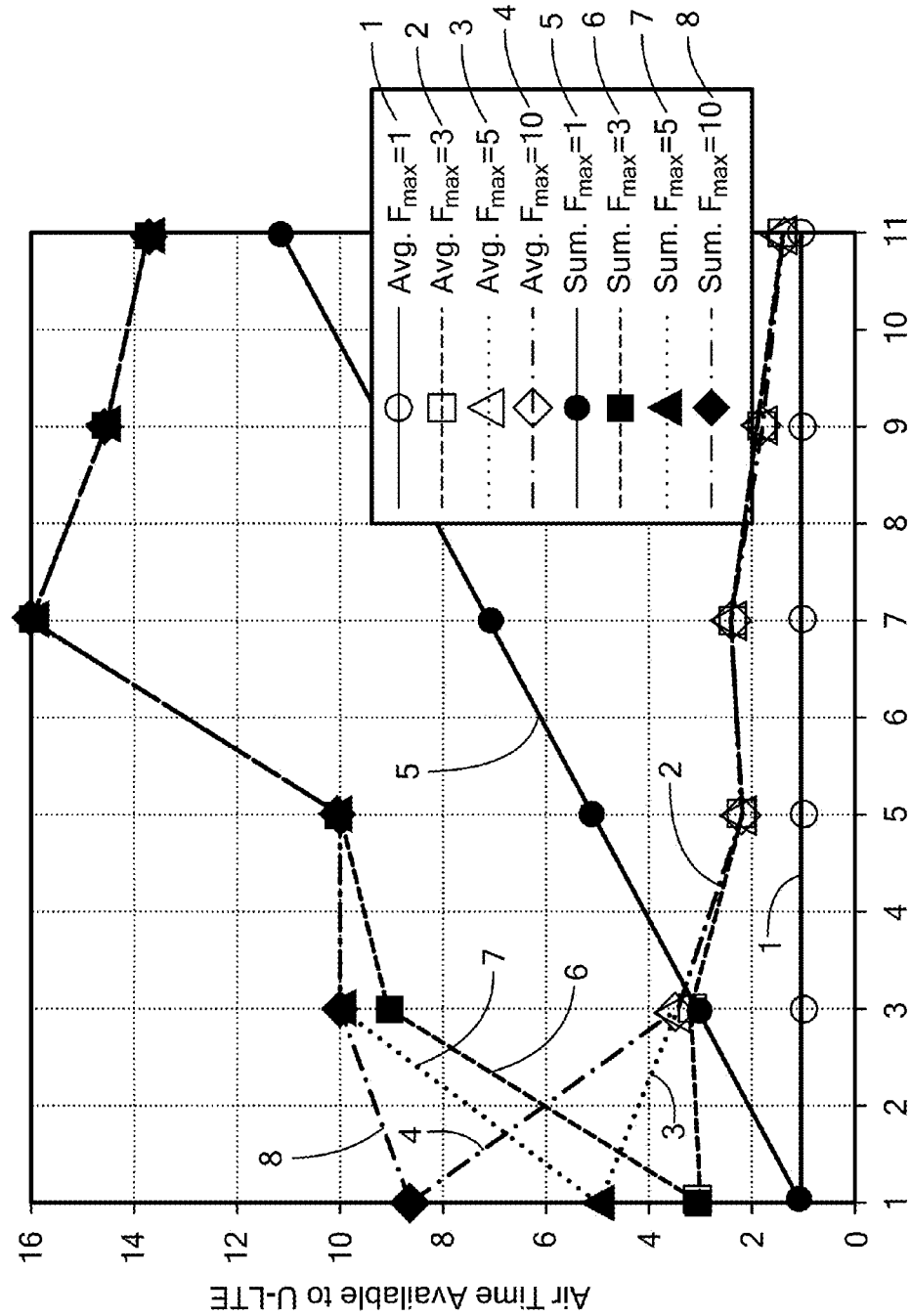
FIG. 3A is a graph of spectrum assignment with different number of LTE Pico cells showing average and sum air time achievable by LTE for various $F_{max}$ values (maximum number of channel values)

In FIG. 3, the channel assignment results are plotted against the number LTE Pico cells. From FIG. 3A one can see that considerable gain in terms of spectrum access time can be achieved with carrier aggregation, while the gain decreases as more LTE Pico networks are deployed. With densely deployed Pico cells, which is 5 in FIG. 3A, there is no need to aggregate more than three channels.

Figure 3B:
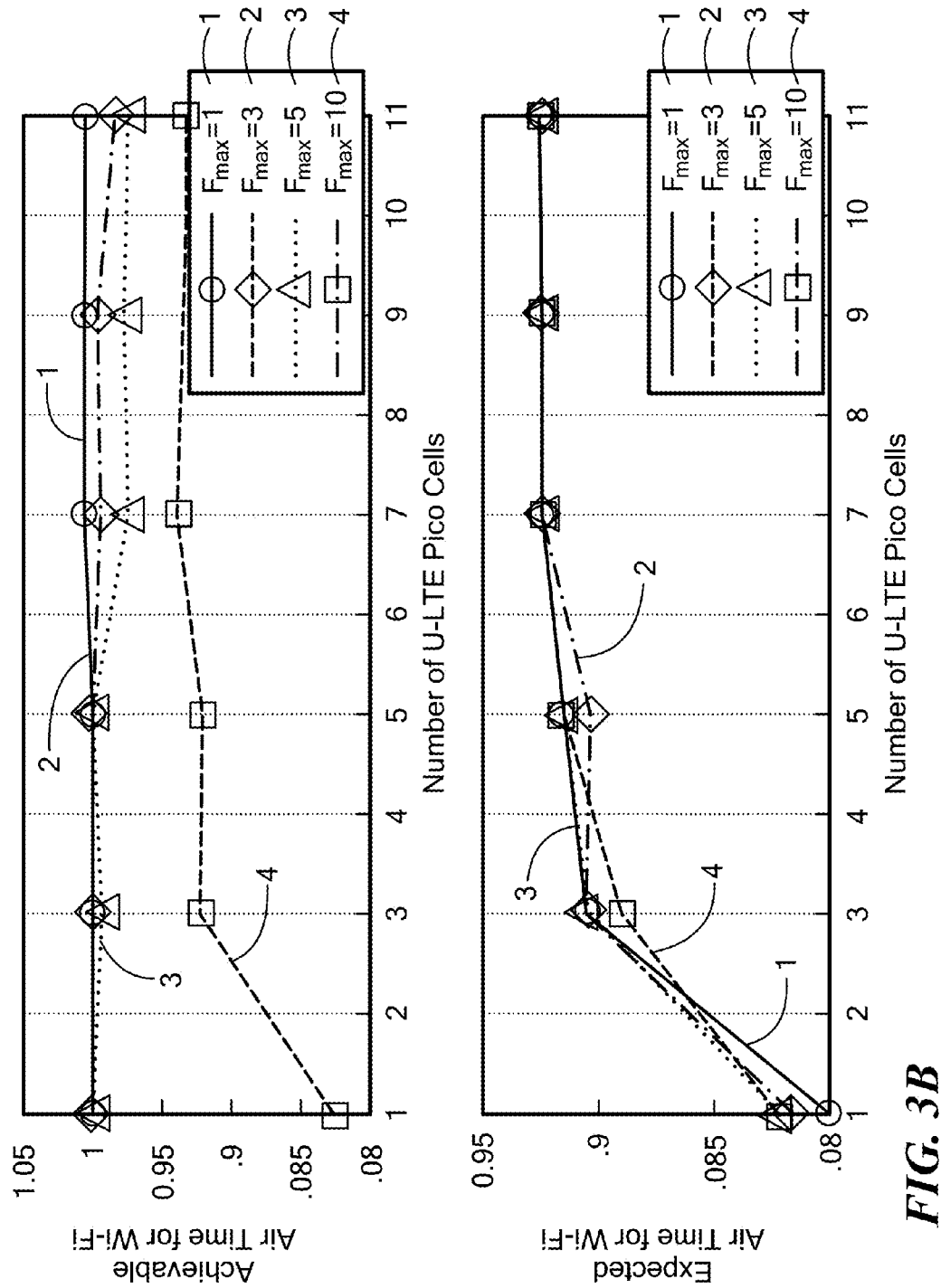
FIG. 3B is a graph of spectrum assignment with a different number of LTE Pico cells with achievable and expected air time for Wi-Fi for various $F_{max}$ values.
Figure 3C:
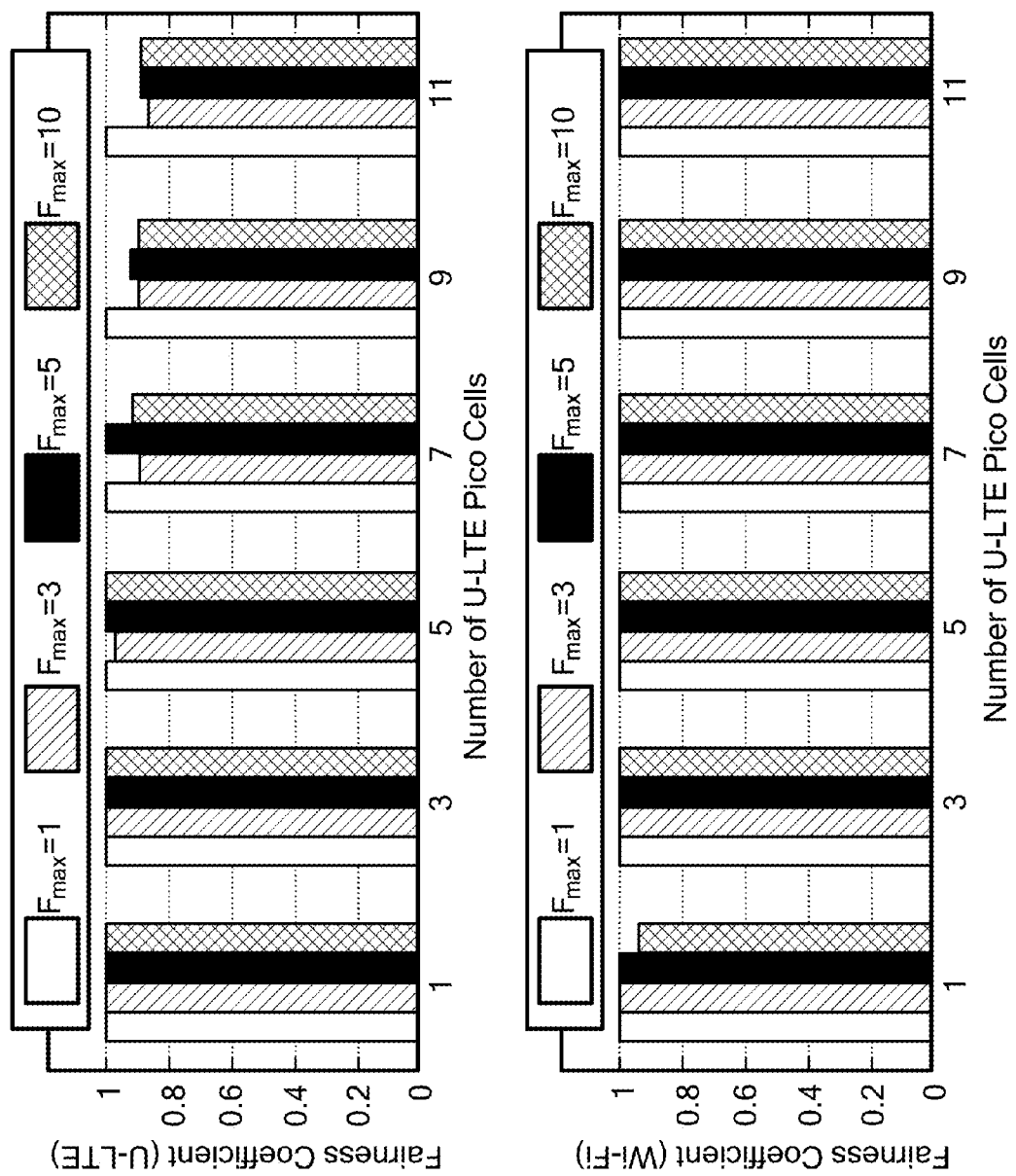
FIG. 3C is a graph of intra-system fairness coefficient of U-LTE (top) and Wi-Fi (bottom) networks, in which for each number of U-LTE Pico cells, the value of $F_{max}$ is 1, 3, 5, or 10, from left to right.

The spectrum access time achievable by Wi-Fi networks is plotted in FIG. 3B. From the bottom figure one can see that, somewhat surprisingly, the Wi-Fi networks harvest more spectrum access time with more interfering LTE Pico cells deployed in the coexistence area. An explanation is that, based on the definition of the cross-technology fairness criterion in Section II, the expected spectrum access time for Wi-Fi networks is calculated according to (21) and this enforces that a Pico cell causing higher interference to Wi-Fi networks (hence smaller $\beta_{w,n}(m)$) is less weighted in (21). Consequently, the coexistence scheme can avoid causing catastrophic performance degradation to Wi-Fi networks in the case that the LTE service providers selfishly deploy many Pico cells. FIG. 3C shows that the inter-system fairness can be well guaranteed in all cases. The corresponding intra-system fairness (Jain's fairness index) is plotted in FIG. 3C, with top figure for LTE and bottom for Wi-Fi networks.

Example 3

Figure 4A:
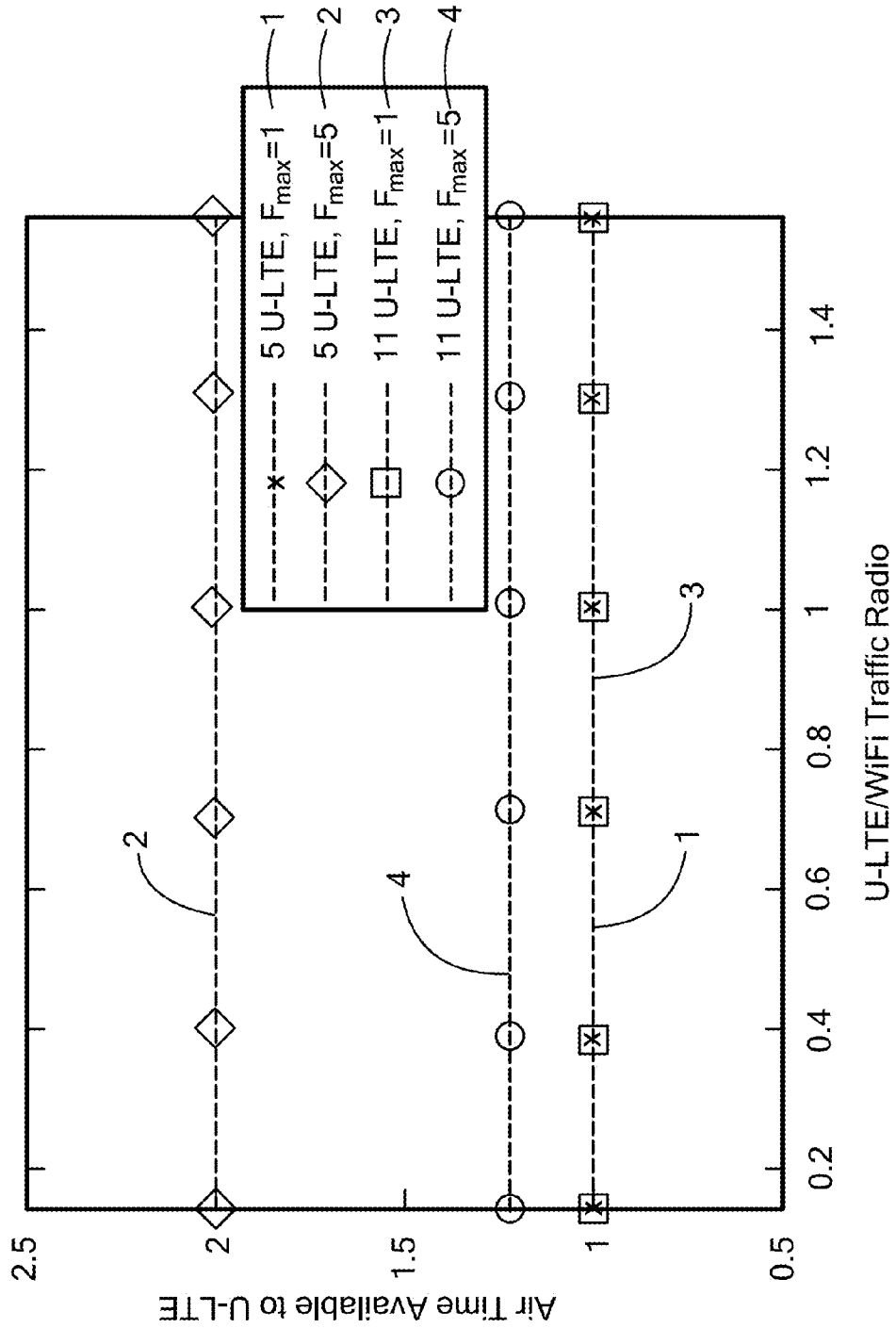
FIG. 4A is a graph of achievable air time for LTE with 5 with different LTE/Wi-Fi traffic ratios.
Figure 4B:
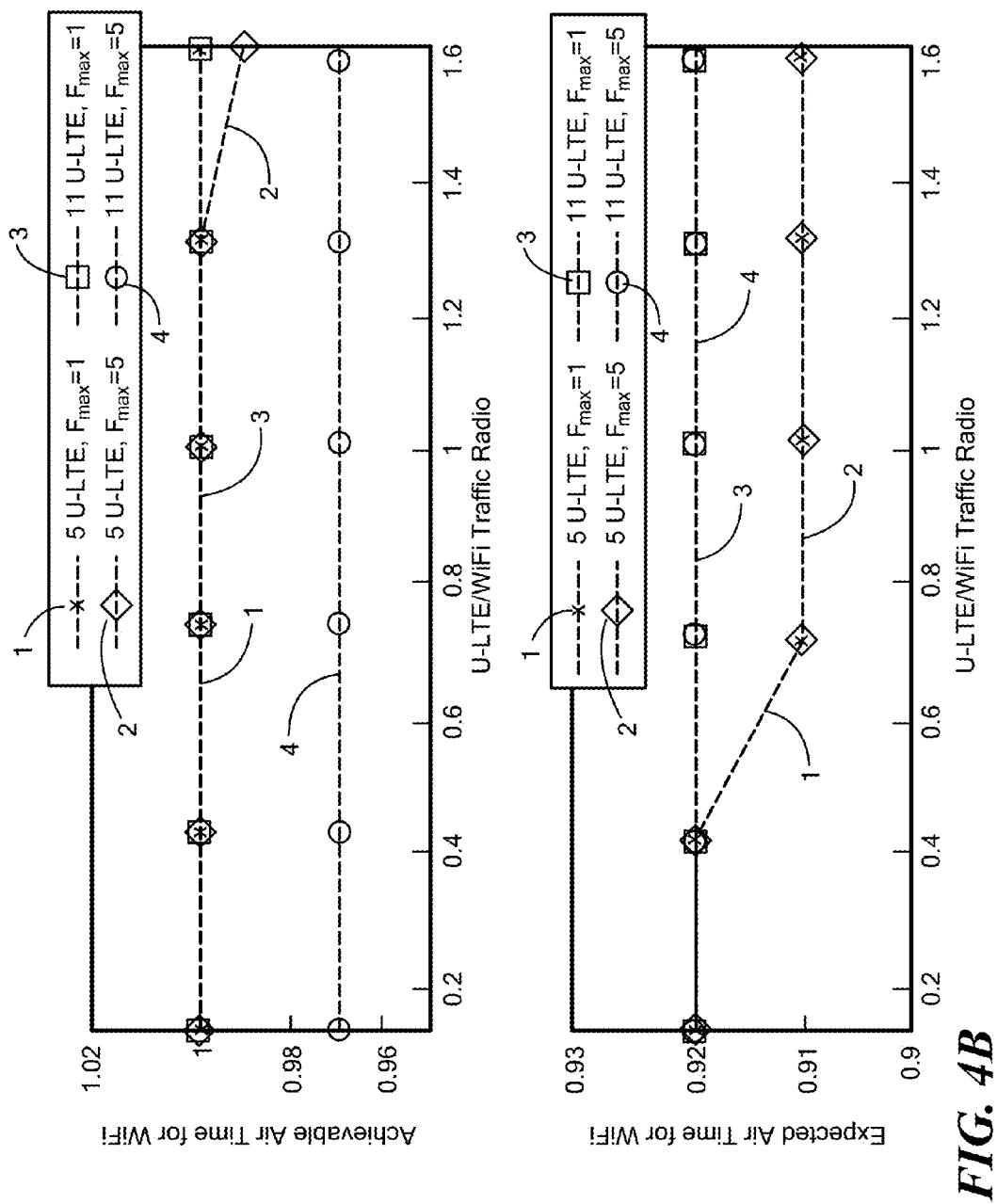
FIG. 4B is a graph of expected and achievable air time for Wi-Fi at various U-LTE/Wi-Fi traffic ratios.
Figure 4C:
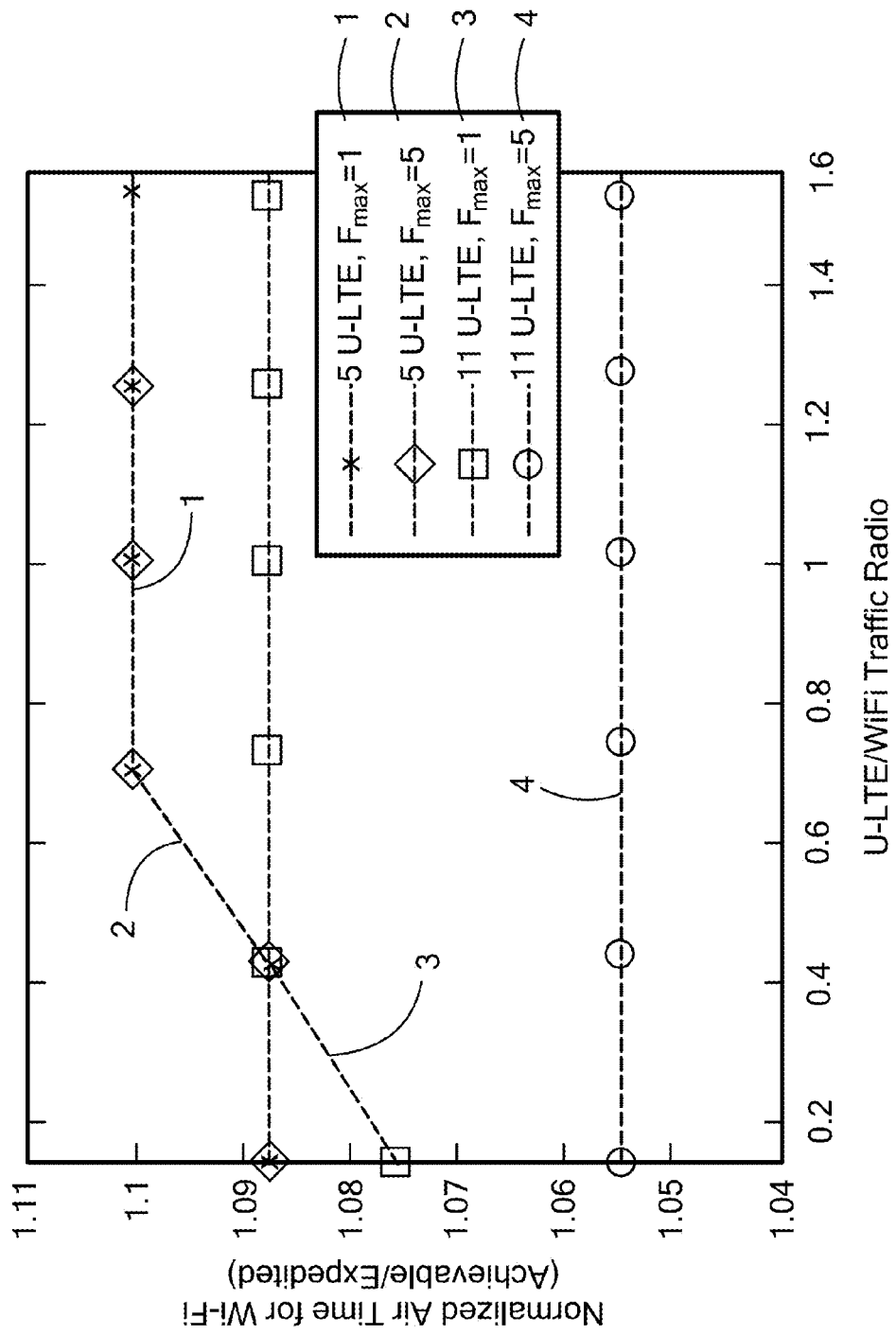
FIG. 4C is a graph of normalized air time for Wi-Fi (achievable/expected) for various U-LTE/Wi-Fi traffic ratios.

FIGS. 4A-4C present the channel assignment results with different LTE/Wi-Fi traffic load ratios. One can find in FIG. 4A that increasing the LTE traffic load does not necessarily lead to more spectrum access time for LTE networks; correspondingly, as in FIGS. 4B and 4C the Wi-Fi performance is degraded only slightly. Again, this is because nearby interfering LTE Pico cells are only lightly weighted by the cross-technology fairness criterion. Therefore, the coexistence architecture is effective in preventing LTE SPs from aggressively offloading traffic to unlicensed bands.

Example 4

Figure 5A:
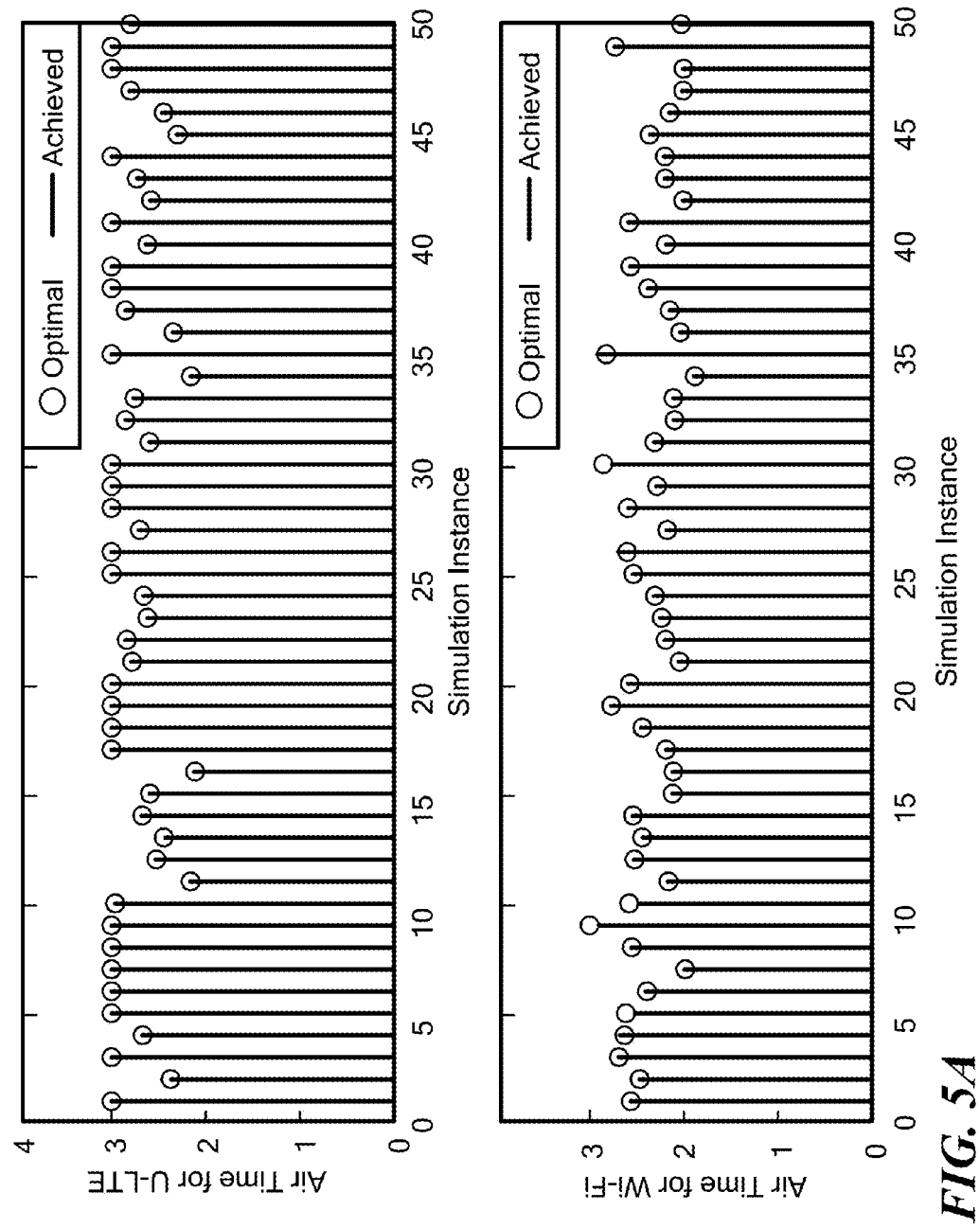
FIG. 5A illustrates graphs of optimal and achieved air time for U-LTE (top) and Wi-Fi (bottom) for combinations of channel assignments for various simulation instances.
Figure 5B:
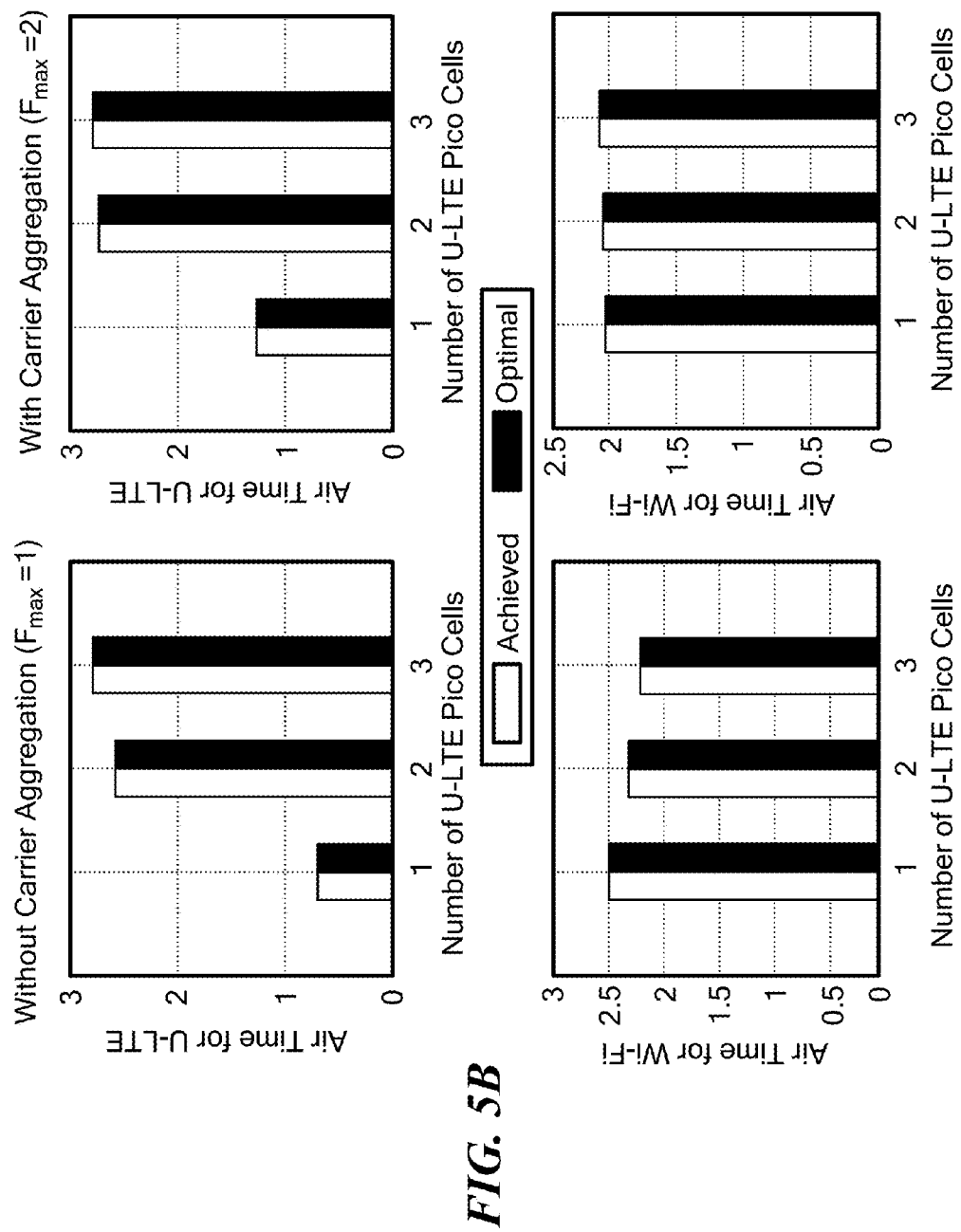
FIG. 5B illustrates graphs of air time for Wi-Fi and U-LTE with and without carrier aggregation for 1, 2 and 3 U-LTE Pico cells.

The optimality of the coexistence architecture in FIG. 5 is verified, by comparing it to the global optimum obtained by enumerating all possible combinations of channel assignments. A communication area of 150×150 m² with 3 Wi-Fi networks is considered. Results are obtained by considering no carrier aggregation and aggregating two channels for 1, 2 and 3 co-located LTE networks. From FIG. 5A one can see that the proposed solution algorithm achieves the global optimum in nearly all tested instances with 3 LTE Pico cells and $F_{max}=2$ while in FIG. 5B the performance difference compared to the global optimum is negligible on average.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A method of sharing a frequency spectrum in a frequency band between a first wireless network and a second coexisting wireless network having overlapping service coverage areas, the first wireless network comprising a plurality of nodes serving user equipment, the method comprising:
   in a host computer system comprising one or more processors and memory in the first wireless network:
   (a) determining a spectrum access time of the first wireless network to be reserved for the coexisting wireless network; and
   (b) determining a channel assignment and an optimized fractional spectrum access (FSA) profile for each of the nodes in the first wireless network, the FSA profile comprising a percentage of air time during which each node can access one or more assigned channels,
   wherein steps (a) and (b) comprise optimizing a utility function of the first wireless network, comprising searching for a spectrum access profile comprising a channel selection α and FSA profile β for the nodes in the first wireless network to satisfy an achieved network utility U equal to or greater than a predefined optimality ratio of an objective function, by iteratively calculating a local upper bound on the objective function through convex relaxation and a local lower bound on the objective function through a local search.

2. The method of claim 1, wherein the channel assignments and FSA profiles are selected to optimize a throughput of the first wireless network, the throughput comprising a data rate of data delivered to the nodes in the first wireless network.

3. The method of claim 1, wherein the objective function is an optimization of a utility of the first wireless network subject to a fairness constraint between the first wireless network and the coexisting wireless network.

4. The method of claim 1, wherein optimizing the utility function is based on a fairness criterion for sharing at least a portion of a frequency spectrum between the first wireless network and the coexisting wireless network, wherein the fairness criterion comprises causing no greater performance degradation of the coexisting wireless network than would be caused by another co-located wireless network offering a same level of traffic load.

5. The method of claim 4, wherein the fairness criterion comprises a summation of muted air time of the first wireless network and opportunistic transmissions of the coexisting wireless network.

6. The method of claim 1, further comprising determining traffic information of the coexisting wireless network, the traffic information comprising one or more of a rate of data packets, a bit rate, and a volume of data packets transmitted in the coexisting wireless network, wherein the traffic information is determined by detecting packets transmitted on the coexisting wireless network by packet sniffing.

7. The method of claim 1, further comprising storing a conflict graph of the first wireless network, the conflict graph comprising a set of interference relationships between pairs of nodes in the first wireless network, the interference relationships based on threshold distances between two nodes of each of the pairs of nodes at which the two nodes can transmit on a same channel simultaneously without causing mutual interference, wherein nodes that conflict according to the conflict graph can share one or more channels based on a time division multiple access technique.

8. The method of claim 1, further comprising determining almost blank subframe (ABSF) patterns based on the reserved spectrum access time, and distributing the ABSF patterns to one or more nodes within the service coverage area of the first wireless network.

9. The method of claim 1,
   wherein the first wireless network comprises a schedule-based wireless network having a plurality of macro cells, each macro cell in communication within a coverage area of a plurality of micro cells, pico cells, or femto cells, or a combination thereof, wherein the host computer system is located at a controlling node of the first wireless network; and/or wherein the coexisting wireless network operates with carrier-sensing-based channel access; and/or wherein the first wireless network and the coexisting wireless network operate in an unlicensed frequency band.

10. The method of claim 1, further comprising transmitting the channel assignments and FSA profiles to one or more of the nodes in the first wireless network.

11. The method of claim 1, further comprising transmitting on the assigned channels using the optimized FSA profile to boost a downlink data rate.

12. A system for sharing a frequency spectrum in a frequency band between a first wireless network and a second coexisting wireless network having overlapping service coverage areas, the first wireless network comprising a plurality of nodes serving user equipment, comprising:
   a host computer system comprising one or more processors and memory, and machine-readable instructions stored in the memory that, upon execution by the one or more processors cause the system to carry out operations comprising:
   (a) determining a spectrum access time of the first wireless network to be reserved for the coexisting wireless network; and
   (b) determining a channel assignment and an optimized fractional spectrum access (FSA) profile for each of the nodes in the first wireless network, the FSA profile comprising a percentage of air time during which each node can access one or more assigned channels,
   wherein operations (a) and (b) comprise optimizing a utility function of the first wireless network, comprising searching for a spectrum access profile comprising a channel selection $\alpha$ and FSA profile $\beta$ for the nodes in the first wireless network to satisfy an achieved network utility U equal to or greater than a predefined optimality ratio of an objective function, by iteratively calculating a local upper bound on the objective function through convex relaxation and a local lower bound on the objective function through a local search, wherein the objective function is an optimization of a utility of the first wireless network subject to a fairness constraint between the first wireless network and the coexisting wireless network.

13. The system of claim 12, wherein the channel assignments and FSA profiles are selected to optimize a throughput of the first wireless network, the throughput comprising a data rate of data delivered to the nodes in the first wireless network.

14. The system of claim 12, wherein optimizing the utility function is based on a fairness criterion for sharing at least a portion of a frequency spectrum between the first wireless network and the coexisting wireless network, wherein the fairness criterion comprises causing no greater performance degradation of the coexisting wireless network than would be caused by another co-located wireless network offering a same level of traffic load, wherein the fairness criterion comprises a summation of muted air time of the first wireless network and opportunistic transmissions of the coexisting wireless network.

15. The system of claim 12, further comprising determining traffic information of the coexisting wireless network, the traffic information comprising one or more of a rate of data packets, a bit rate, and a volume of data packets transmitted in the coexisting wireless network, wherein the traffic information is determined by detecting packets transmitted on the coexisting wireless network by packet sniffing.

16. The system of claim 12, further comprising a conflict graph of the first wireless network stored in the memory, the conflict graph comprising a set of interference relationships between pairs of nodes in the first wireless network, the interference relationships based on threshold distances between two nodes of each of the pairs of nodes at which the two nodes can transmit on a same channel simultaneously without causing mutual interference, wherein nodes that conflict according to the conflict graph can share one or more channels based on a time division multiple access technique.

17. The system of claim 12, further comprising determining almost blank subframe (ABSF) patterns based on the reserved spectrum access time, and distributing the ABSF patterns to one or more nodes within the service coverage area of the first wireless network.

18. The system of claim 12,
   wherein the first wireless network comprises a schedule-based wireless network having a plurality of macro cells, each macro cell in communication within a coverage area of a plurality of micro cells, pico cells, or femto cells, or a combination thereof, wherein the host computer system is located at a controlling node of the first wireless network; and/or
   wherein the coexisting wireless network operates with carrier-sensing-based channel access; and/or
   wherein the first wireless network and the coexisting wireless network operate in an unlicensed frequency band; and/or
   wherein the first wireless network employs a centralized control of spectrum access and the coexisting wireless network employs a distributed control of spectrum access.

19. The system of claim 12, further comprising transmitting the channel assignments and FSA profiles to one or more of the nodes in the first wireless network, or transmitting on the assigned channels using the optimized FSA profile to boost a downlink data rate.

20. The system of claim 12, wherein the first wireless network employs a centralized control of spectrum access and the coexisting wireless network employs a distributed control of spectrum access.

21. A method of sharing a frequency spectrum in a frequency band between a first wireless network and a second coexisting wireless network having overlapping service coverage areas, the first wireless network comprising a plurality of nodes serving user equipment, the method comprising:
   in a host computer system comprising one or more processors and memory in the first wireless network:
   (a) determining a spectrum access time of the first wireless network to be reserved for the coexisting wireless network; and
   (b) determining a channel assignment and an optimized fractional spectrum access (FSA) profile for each of the nodes in the first wireless network, the FSA profile comprising a percentage of air time during which each node can access one or more assigned channels,
   wherein steps (a) and (b) comprise optimizing a utility function of the first wireless network based on a fairness criterion for sharing at least a portion of a frequency spectrum between the first wireless network and the coexisting wireless network, wherein the fairness criterion comprises causing no greater performance degradation of the coexisting wireless network than would be caused by another co-located wireless network offering a same level of traffic load.

22. The method of claim 21, wherein the fairness criterion comprises a summation of muted air time of the first wireless network and opportunistic transmissions of the coexisting wireless network.

23. A method of sharing a frequency spectrum in a frequency band between a first wireless network and a second coexisting wireless network having overlapping service coverage areas, the first wireless network comprising a plurality of nodes serving user equipment, the method comprising:
in a host computer system comprising one or more processors and memory in the first wireless network:
determining a spectrum access time of the first wireless network to be reserved for the coexisting wireless network;
determining a channel assignment and an optimized fractional spectrum access (FSA) profile for each of the nodes in the first wireless network, the FSA profile comprising a percentage of air time during which each node can access one or more assigned channels; and
storing a conflict graph of the first wireless network, the conflict graph comprising a set of interference relationships between pairs of nodes in the first wireless network, the interference relationships based on threshold distances between two nodes of each of the pairs of nodes at which the two nodes can transmit on a same channel simultaneously without causing mutual interference, wherein nodes that conflict according to the conflict graph can share one or more channels based on a time division multiple access technique.

24. A system for sharing a frequency spectrum in a frequency band between a first wireless network and a second coexisting wireless network having overlapping service coverage areas, the first wireless network comprising a plurality of nodes serving user equipment, comprising:
a host computer system comprising one or more processors and memory, and machine-readable instructions stored in the memory that, upon execution by the one or more processors cause the system to carry out operations comprising:
(a) determining a spectrum access time of the first wireless network to be reserved for the coexisting wireless network; and
(b) determining a channel assignment and an optimized fractional spectrum access (FSA) profile for each of the nodes in the first wireless network, the FSA profile comprising a percentage of air time during which each node can access one or more assigned channels;
wherein operations (a) and (b) comprise optimizing a utility function of the first wireless network based on a fairness criterion for sharing at least a portion of a frequency spectrum between the first wireless network and the coexisting wireless network, wherein the fairness criterion comprises causing no greater performance degradation of the coexisting wireless network than would be caused by another co-located wireless network offering a same level of traffic load, and wherein the fairness criterion comprises a summation of muted air time of the first wireless network and opportunistic transmissions of the coexisting wireless network.

25. The system of claim 24,
wherein the first wireless network comprises a schedule-based wireless network having a plurality of macro cells, each macro cell in communication within a coverage area of a plurality of micro cells, pico cells, or femto cells, or a combination thereof, wherein the host computer system is located at a controlling node of the first wireless network; and/or
wherein the coexisting wireless network operates with carrier-sensing-based channel access; and/or
wherein the first wireless network and the coexisting wireless network operate in an unlicensed frequency band; and/or
wherein the first wireless network employs a centralized control of spectrum access and the coexisting wireless network employs a distributed control of spectrum access.

26. The system of claim 24, wherein the first wireless network employs a centralized control of spectrum access and the coexisting wireless network employs a distributed control of spectrum access.

27. A system for sharing a frequency spectrum in a frequency band between a first wireless network and a second coexisting wireless network having overlapping service coverage areas, the first wireless network comprising a plurality of nodes serving user equipment, comprising:
a host computer system comprising one or more processors and memory, and machine-readable instructions stored in the memory that, upon execution by the one or more processors cause the system to carry out operations comprising:
(a) determining a spectrum access time of the first wireless network to be reserved for the coexisting wireless network; and
(b) determining a channel assignment and an optimized fractional spectrum access (FSA) profile for each of the nodes in the first wireless network, the FSA profile comprising a percentage of air time during which each node can access one or more assigned channels; and
a conflict graph of the first wireless network stored in the memory, the conflict graph comprising a set of interference relationships between pairs of nodes in the first wireless network, the interference relationships based on threshold distances between two nodes of each of the pairs of nodes at which the two nodes can transmit on a same channel simultaneously without causing mutual interference, wherein nodes that conflict according to the conflict graph can share one or more channels based on a time division multiple access technique.

28. The system of claim 27,
wherein the first wireless network comprises a schedule-based wireless network having a plurality of macro cells, each macro cell in communication within a coverage area of a plurality of micro cells, pico cells, or femto cells, or a combination thereof, wherein the host computer system is located at a controlling node of the first wireless network; and/or
wherein the coexisting wireless network operates with carrier-sensing-based channel access; and/or
wherein the first wireless network and the coexisting wireless network operate in an unlicensed frequency band; and/or
wherein the first wireless network employs a centralized control of spectrum access and the coexisting wireless network employs a distributed control of spectrum access.

29. The system of claim 27, wherein the first wireless network employs a centralized control of spectrum access and the coexisting wireless network employs a distributed control of spectrum access.

* * * * *